United States Patent
Suzuki et al.

(10) Patent No.: US 9,515,324 B2
(45) Date of Patent: Dec. 6, 2016

(54) METHOD FOR MANUFACTURING FUEL CELL SEPARATOR

(71) Applicants: Yukihiro Suzuki, Kariya (JP); Eiichiro Morozumi, Kariya (JP); Takatoshi Asaoka, Kariya (JP)

(72) Inventors: Yukihiro Suzuki, Kariya (JP); Eiichiro Morozumi, Kariya (JP); Takatoshi Asaoka, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 73 days.

(21) Appl. No.: 14/409,874

(22) PCT Filed: Jul. 3, 2013

(86) PCT No.: PCT/JP2013/068294
§ 371 (c)(1),
(2) Date: Dec. 19, 2014

(87) PCT Pub. No.: WO2014/010491
PCT Pub. Date: Jan. 16, 2014

(65) Prior Publication Data
US 2015/0140204 A1    May 21, 2015

(30) Foreign Application Priority Data
Jul. 11, 2012    (JP) ................ 2012-155642

(51) Int. Cl.
*H01G 11/66*    (2013.01)
*H01M 8/02*    (2016.01)
(Continued)

(52) U.S. Cl.
CPC ............. *H01M 8/0202* (2013.01); *C25D 5/48* (2013.01); *C25D 5/54* (2013.01); *C25D 9/02* (2013.01);
(Continued)

(58) Field of Classification Search
USPC ................. 427/115, 180, 201, 369, 366, 370
See application file for complete search history.

(56) References Cited

U.S. PATENT DOCUMENTS

| | | | |
|---|---|---|---|
| 6,440,598 B1 * | 8/2002 | Fukui | H01M 8/0204 29/623.5 |
| 2004/0157108 A1 * | 8/2004 | Blunk | H01M 8/0206 429/482 |

(Continued)

FOREIGN PATENT DOCUMENTS

| | | |
|---|---|---|
| JP | 2003-197217 | 7/2003 |
| JP | 2003-297383 | 10/2003 |

(Continued)

OTHER PUBLICATIONS

International Search Report for PCT/JP2013/068294, mailed Oct. 15, 2013, 2 pgs.

(Continued)

*Primary Examiner* — Brian K Talbot
(74) *Attorney, Agent, or Firm* — Patterson Thuente Pedersen, P.A.

(57) ABSTRACT

A separator is provided that has a metal substrate and a conductive resin layer on the surface of the metal substrate. The conductive resin layer contains a resin and a conductive substance dispersed in the resin. The separator is configured such that the proportion of the conductive substance to the resin increases continuously from the metal substrate toward the surface of the separator.

7 Claims, 15 Drawing Sheets

(FIRST EMBODIMENT)

(FIRST STEP)

(51) Int. Cl.
*C25D 5/48* (2006.01)
*C25D 5/54* (2006.01)
*C25D 9/02* (2006.01)
*H01M 4/64* (2006.01)
*B05D 3/12* (2006.01)

(52) U.S. Cl.
CPC ......... H01M 8/0206 (2013.01); H01M 8/0221 (2013.01); H01M 8/0226 (2013.01); H01M 8/0228 (2013.01); H01M 8/0254 (2013.01); *B05D 3/12* (2013.01); *H01G 11/66* (2013.01); *H01M 4/64* (2013.01); *H01M 8/0267* (2013.01); *Y02E 60/50* (2013.01); *Y02P 70/56* (2015.11)

(56) References Cited

U.S. PATENT DOCUMENTS

| | | | | |
|---|---|---|---|---|
| 2005/0048367 | A1* | 3/2005 | Igaki | H01M 4/0404 429/212 |
| 2006/0280992 | A1 | 12/2006 | Miyagawa | |
| 2008/0003503 | A1* | 1/2008 | Kawakami | H01G 9/155 429/231.5 |
| 2008/0098994 | A1* | 5/2008 | Innes | F02C 7/22 123/525 |
| 2008/0268318 | A1* | 10/2008 | Jang | H01M 8/0206 429/492 |
| 2009/0029261 | A1* | 1/2009 | Thomas-Alyea | H01M 2/166 429/248 |
| 2009/0226787 | A1* | 9/2009 | Tanaka | H01M 8/0206 429/523 |
| 2010/0055301 | A1* | 3/2010 | Naoi | H01M 4/0404 427/77 |
| 2010/0261065 | A1* | 10/2010 | Babinec | H01M 2/166 429/246 |
| 2012/0064232 | A1* | 3/2012 | Yamazaki | H01M 8/0206 427/115 |
| 2014/0051012 | A1* | 2/2014 | Hsieh | H01M 8/0204 429/514 |

FOREIGN PATENT DOCUMENTS

| | | |
|---|---|---|
| JP | 2004-014272 | 1/2004 |
| JP | 2005-005137 | 1/2005 |
| JP | 2005-243354 | 9/2005 |
| JP | 2006-269090 | 10/2006 |
| JP | 2007-172974 | 7/2007 |
| JP | 2007-273458 | 10/2007 |
| JP | 2008-166109 | 7/2008 |
| JP | 2009-181936 | 8/2009 |
| JP | 2010-061968 | 3/2010 |
| JP | 2010-140800 | 6/2010 |
| JP | 2010-186578 | 8/2010 |

OTHER PUBLICATIONS

English translation of International Preliminary Report on Patentability and Written Opinion for PCT/JP2013/068294, 6 pages.
Extended European Search Report for EP Application No. 13817580.7, mailed Apr. 20, 2016 (7 pgs).

* cited by examiner (FIRST EMBODIMENT)

(FIRST EMBODIMENT)

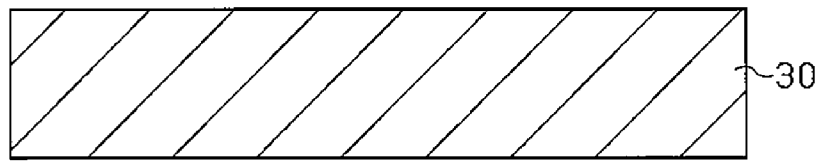
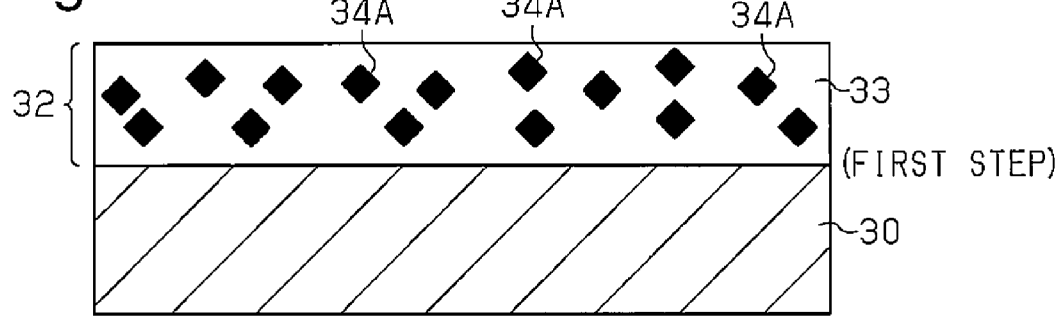
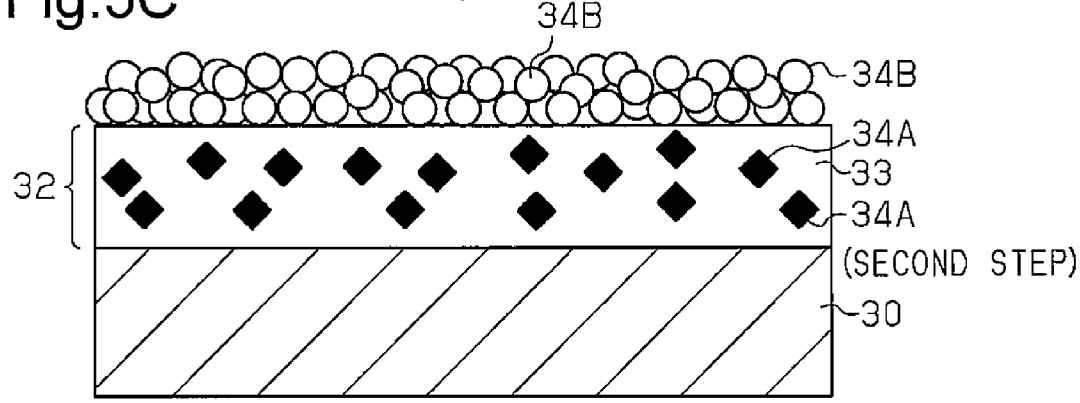
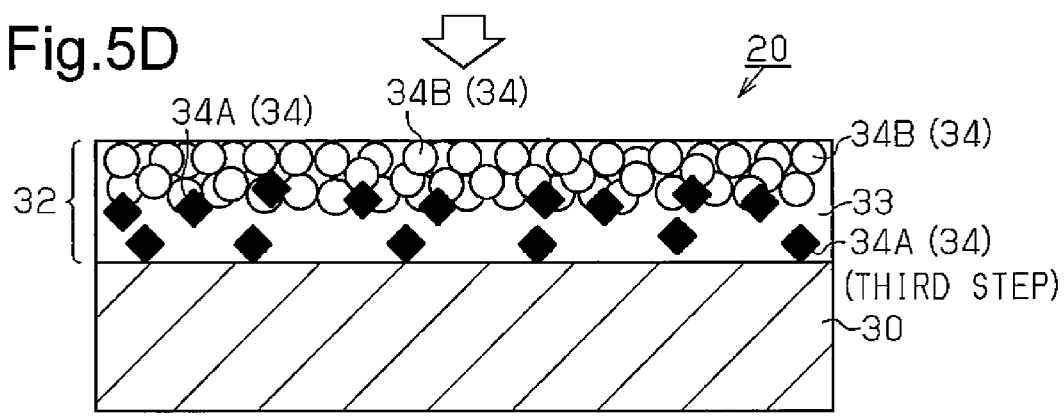

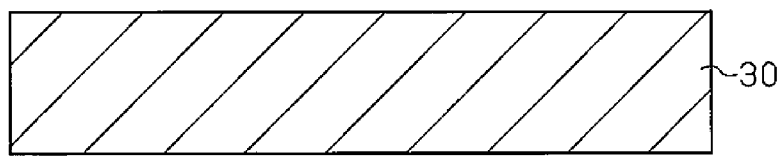
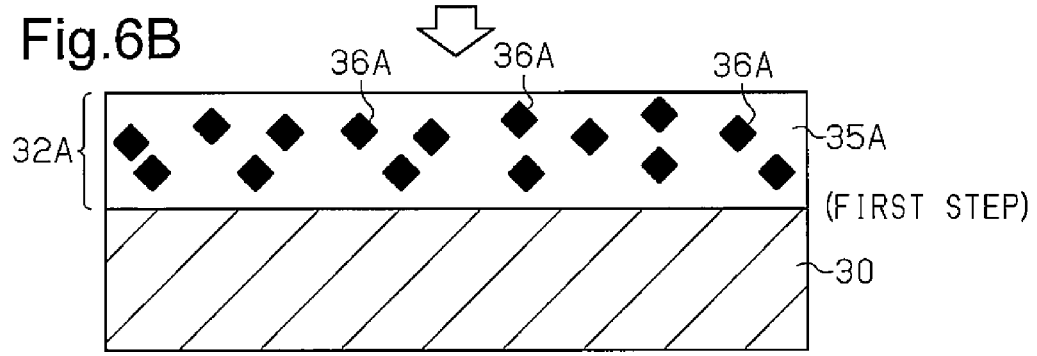
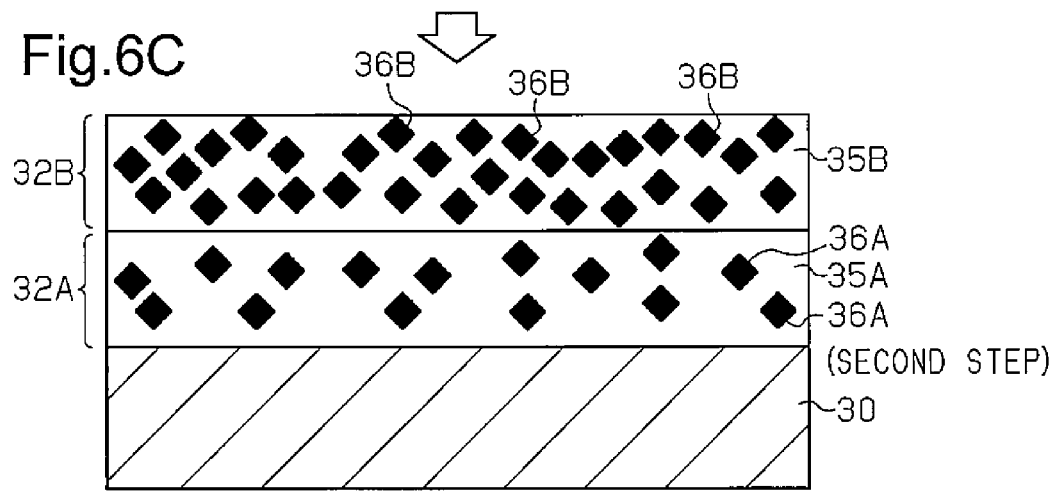
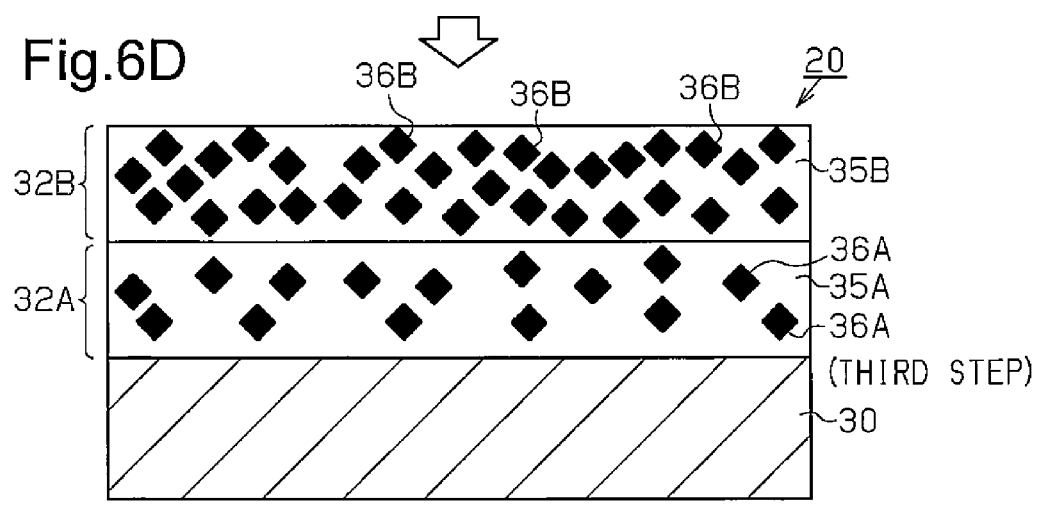

(THIRD EMBODIMENT)

(THIRD EMBODIMENT)

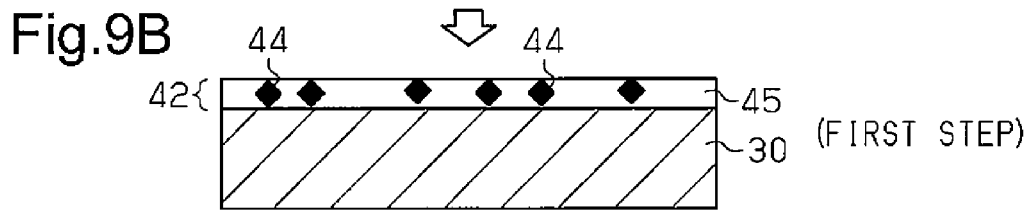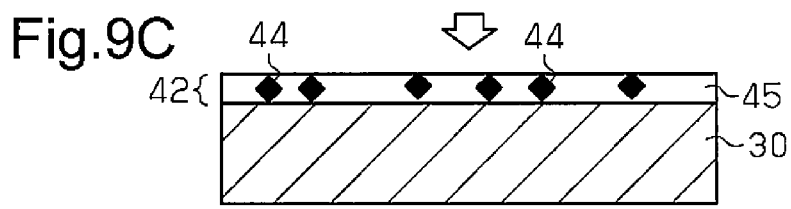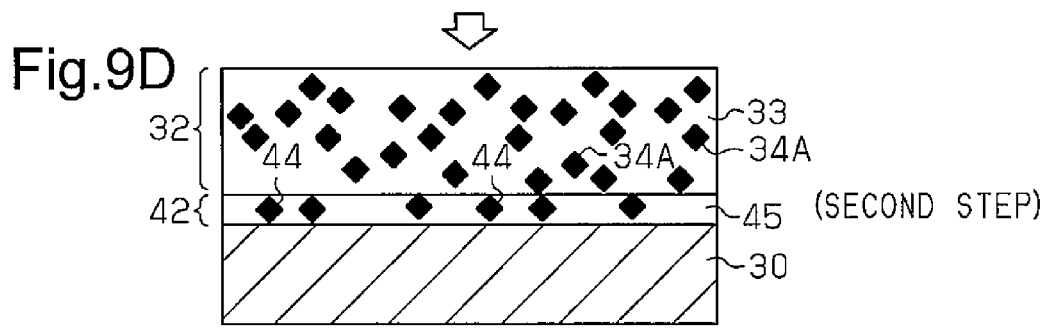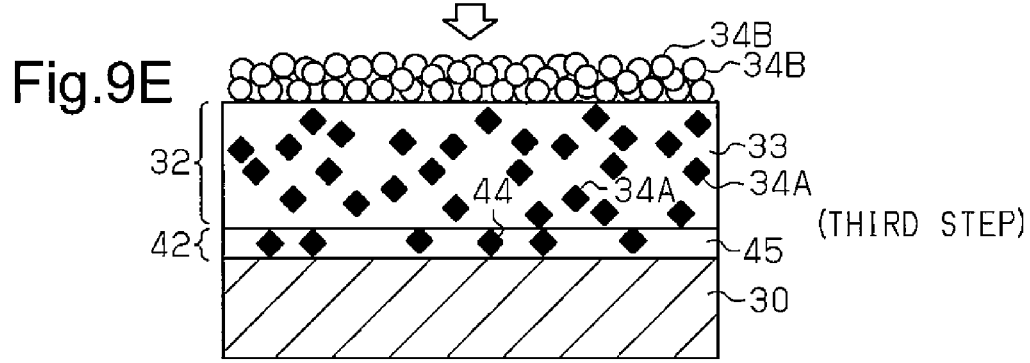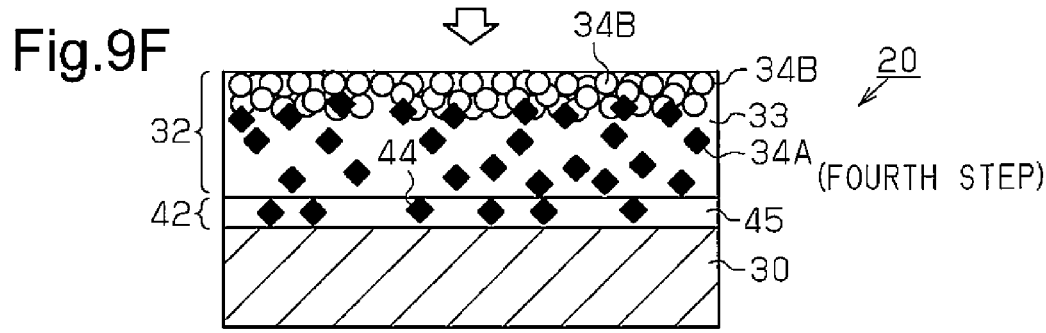

Fig.10A
(FOURTH EMBODIMENT)
Fig.10B (FIRST STEP)
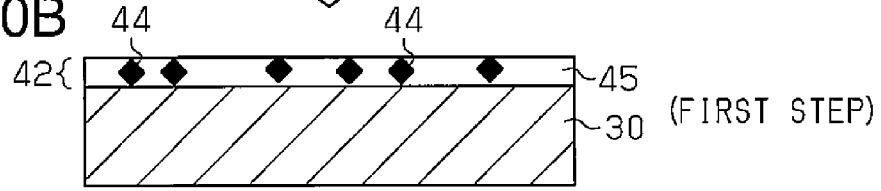
Fig.10C
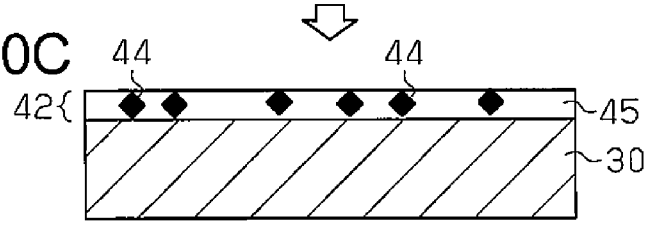
Fig.10D (SECOND STEP)
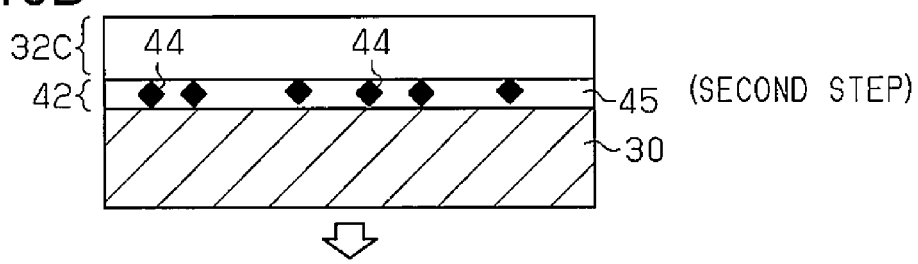
Fig.10E (THIRD STEP)
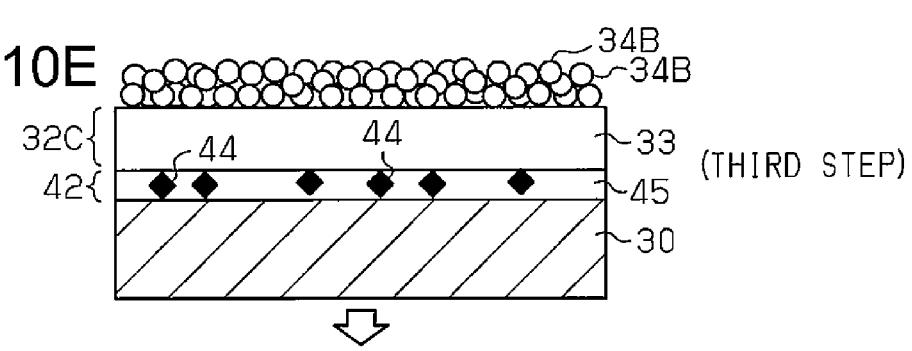
Fig.10F (FOURTH STEP)
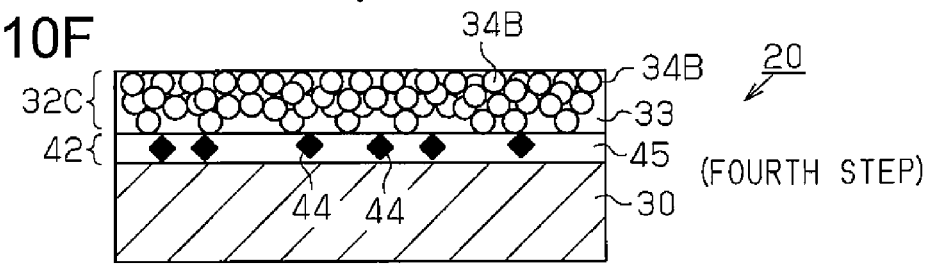

(FIFTH EMBODIMENT)

(FIRST STEP)

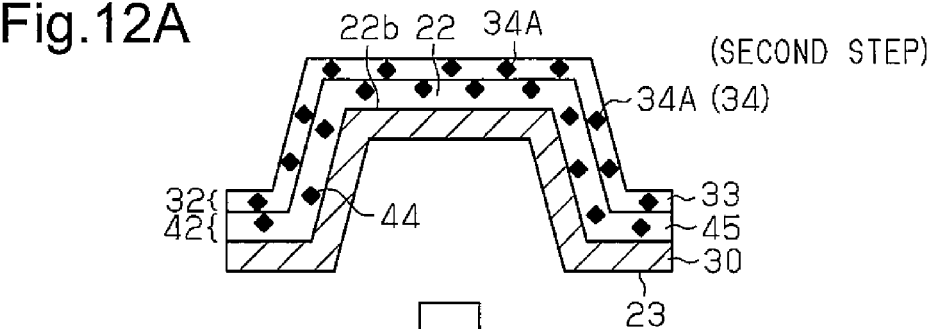
Fig.12A (SECOND STEP)
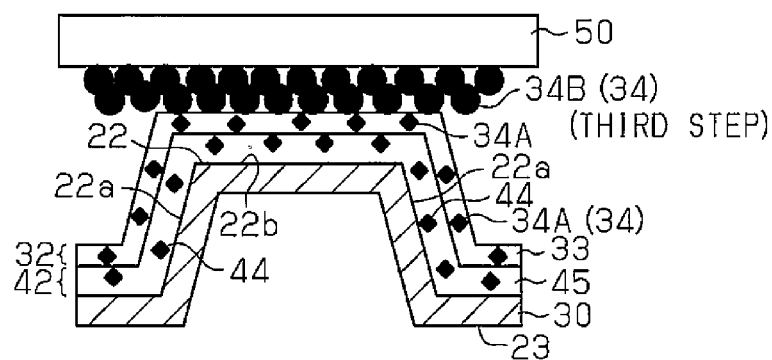
Fig.12B (THIRD STEP)
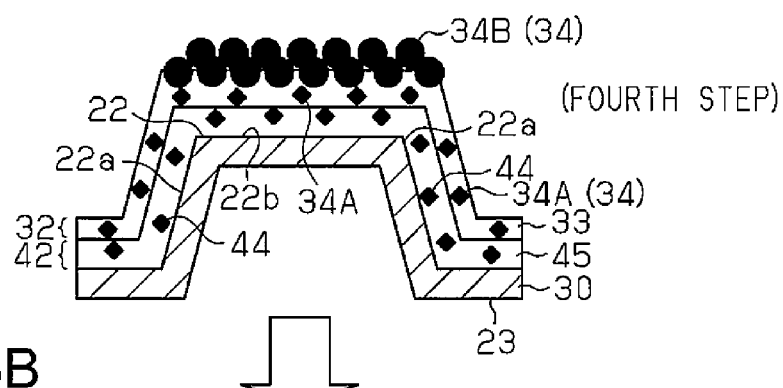
Fig.13A (FOURTH STEP)
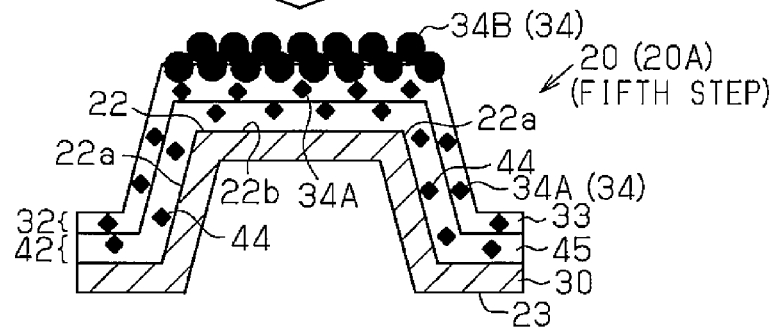
Fig.13B (FIFTH STEP)

(FIRST CONVENTIONAL EXAMPLE)

(SECOND CONVENTIONAL EXAMPLE)

Fig.24A(Prior Art)
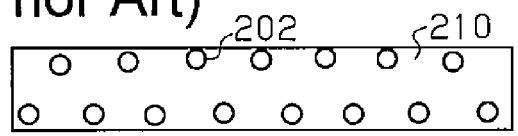
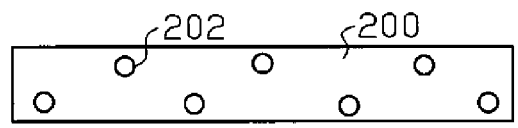
Fig.24B(Prior Art)
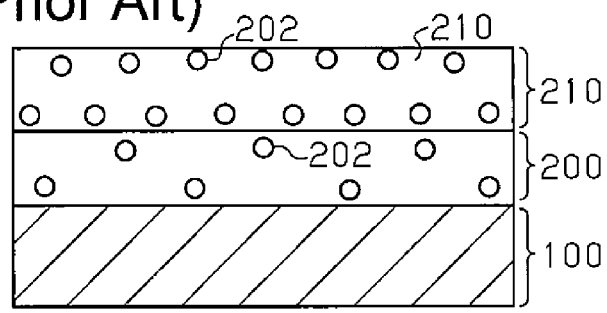
Fig.24C(Prior Art)
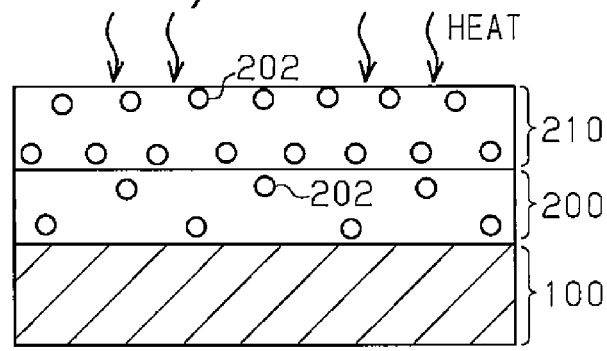
Fig.25(Prior Art)
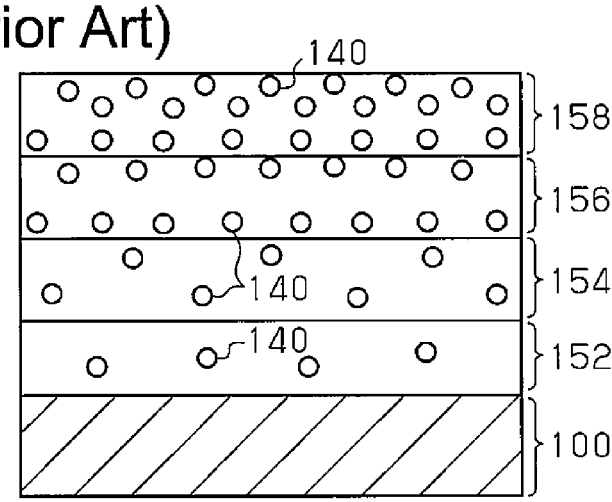

METHOD FOR MANUFACTURING FUEL CELL SEPARATOR

RELATED APPLICATIONS

The present application is a National Phase entry of PCT Application No. PCT/JP2013/068294, filed Jul. 3, 2013, which application claims priority to Japanese Application No. 2012-155642, filed Jul. 11, 2012, both of said applications being hereby incorporated by reference in their entirety.

BACKGROUND OF THE INVENTION

The present invention relates to a fuel cell separator, and a method for manufacturing a fuel cell separator.

Solid polymer fuel cells each include a membrane electrode assembly (MEA) including an electrolyte membrane composed of an ion exchange membrane and a pair of electrodes having the electrolyte membrane in between, and a pair of separators having the MEA in between. The pair of separators and the MEA define gas flow paths. Fuel gas (such as hydrogen gas) is supplied to one of the gas flow paths and oxidizing gas (such as air) is supplied to the other gas flow path. For the separator, metallic separators have been proposed to date. The metallic separators need to have high conductivity, high fuel gas tightness, and high corrosion resistance in oxidation reduction reactions of the fuel gas and oxidizing gas. Examples of materials for such metallic separators include stainless steel (SUS) and titanium.

Such metallic separators are known in Japanese Laid-Open Patent Publication No. 2004-14272 and Japanese Laid-Open Patent Publication No. 2006-269090. As shown in FIG. 21A, the separator according to Japanese Laid-Open Patent Publication No. 2004-14272 includes a metal substrate 100, and a conductive resin layer 106 on a surface of the metal substrate 100, the conductive resin layer 106 containing a mixture of a resin 102 and a conductive filler 104 of a metal carbide. The conductive resin layer 106 is configured such that the content of the conductive filler 104 per volume is continuously reduced from the metal substrate 100 (interface of the substrate) to the surface of the separator (hereinafter referred to as a first conventional separator).

Japanese Laid-Open Patent Publication No. 2004-14272 also proposes a metal separator (hereinafter referred to as a second conventional separator) as shown in FIG. 21B in which a low electric resistance layer 108 is provided on the surface of the conductive resin layer 106, the low electric resistance layer 108 containing a conductive filler 110 composed of a carbon material and having a volume resistivity lower than that of the surface of the conductive resin layer 106. The configuration shown in FIG. 21B brings an advantage of significantly reducing the contact resistance between the separator and a gas diffusion layer (GDL).

As shown in FIG. 23, Japanese Laid-Open Patent Publication No. 2006-269090 proposes a metal separator including a metal substrate 100, a first resin layer 120 on the surface of the metal substrate 100, and a second resin layer 130 on the surface of the first resin layer 120 (hereinafter referred to as a third conventional separator). The first resin layer 120 and the second resin layer 130 each contain a conductive filler 118. The volume resistivity of the second resin layer 130 is smaller than that volume resistivity of the first resin layer 120.

FIG. 22 shows a relationship between the position in the direction of thickness of the conductive layer or the resin layer and the proportion of the conductive filler (conductive particles) in the conventional examples. The solid line indicates the example shown in FIG. 21A, the dotted line indicates the example shown in FIG. 21B, and the long dashed short dashed line indicates the example in FIG. 23.

Japanese Laid-Open Patent Publication No. 2005-243354 proposes a method for manufacturing a fuel cell separator (referred to as a first conventional method). In the first conventional method, a first resin sheet 200 containing a conductive substance 202 and a second resin sheet 210 containing a conductive substance 202 are layered on a metal substrate 100 as shown in FIG. 24A to be bonded, and are integrally formed with the metal substrate 100 by heat press as shown in FIG. 24B. The content of the conductive substance 202 in the second resin sheet 210 is higher than the content of the conductive substance 202 in the first resin sheet 200. After integral formation, the separator is surface treated by heating at a temperature of the melting point of the resin or higher as shown in FIG. 24C.

In another typical method for manufacturing a fuel cell separator, as shown in FIG. 25, after a mixed solution of a conductive substance 140 and a resin is applied onto a metal substrate 100, and is cured to form a resin layer 152, a mixed solution of the conductive substance 140 and a resin is applied onto the surface of the resin layer 152, and is cured in the same manner. Thus, resin layers 154, 156, and 158 are sequentially formed (referred to as a second conventional method).

Japanese Laid-Open Patent Publication No. 2007-273458 discloses a method for manufacturing a fuel cell separator in which a mixed solution of a conductive ceramic and a resin (binder resin) is applied onto a metal substrate, and is dried in an oven to be burned.

SUMMARY OF THE INVENTION

The first conventional separator has high contact resistance because the separator has a small volume of a conductive path between the gas diffusion layer (GDL) and the surface of the separator, the conductive path being located on the surface of the MEA.

When separators are connected or a separator is connected through a porous member to a GDL to form a fuel cell, the contact resistances are unintentionally increased. For example, in a case where separators are electrically connected, when the contacting surfaces of the separators each have a 100% conductive path, this connection provides a 100% conductive path. On the other hand, when the contacting surfaces of the separators each have an 80% conductive path, this connection provides only a conductive path of 80(%)×80(%)=64%. Such a reduction in the conductive path increases the contact resistance.

The second conventional separator includes a low electric resistance layer on the surface to reduce the contact resistance between the separator and the GDL compared to the first conventional separator. However, the surface of the conductive resin layer as a first layer has a small volume of a conductive path. This increases the interface resistance between the conductive resin layer and the low electric resistance layer.

The third conventional separator has high interface resistance between the first resin layer and the second resin layer and has high volume resistivity of the first resin layer, which increases the contact resistance. When separators are connected or a separator is connected through a porous member to a GDL to form a fuel cell, the contact resistance is unintentionally increased.

In the manufacturing method of the first conventional method, a conductive resin sheet is prepared, and is bonded to a metal substrate. This increases costs. Furthermore, this manufacturing method cannot be applied to separators having surfaces with complicated grooves because those types of separators are difficult to bond to resin sheets.

In the second conventional method, the respective resin layers are prepared through several applications, which increases costs and the total thickness of the resin layer. Furthermore, the resulting separator is multilayer, which increases variations in the thicknesses of the layer.

A first objective of the present invention is to provide a fuel cell separator that significantly reduces the contact resistance between the separator and a GDL and the contact resistance between the separator and another separator to reduce the internal resistance of the fuel cell, suppresses a reduction in voltage in the cell, and attains a compact fuel cell with higher output.

A second objective of the present invention is to provide a method for manufacturing a fuel cell separator that produces fuel cell separators at low cost with not only flat plate metal substrates but also metal substrates having complicated grooves, applies conductive particles to these substrates sufficiently, reduces variations in the thickness of the layer, and also reduces the thickness of a conductive resin layer.

To achieve the foregoing objective and in accordance with one aspect of the present invention, a fuel cell separator is provided that includes a metal substrate and a conductive resin layer, which is located on a surface (one or both sides) of the metal substrate and contains a resin and a conductive substance dispersed in the resin. The proportion of the conductive substance to the resin continuously increases from the metal substrate toward a surface of the fuel cell separator.

In accordance with a second aspect, the conductive resin layer forms a conductive resin main layer. The fuel cell separator comprises a conductive resin sublayer located between the conductive resin main layer and the metal substrate. The conductive resin sublayer contains a sublayer resin and a sublayer conductive substance dispersed in the sublayer resin. The conductive resin sublayer prevents elution of metal ions from the metal substrate.

In accordance with a third aspect, the metal substrate has a surface including a contact portion that contacts a gas diffusion layer or another separator in a fuel cell and a non-contact portion that cannot contact the gas diffusion layer or another separator and defines a water path. The conductive resin main layer and the conductive resin sublayer are formed on the contact portion and the non-contact portion. The conductive resin main layer is hydrophilic in the non-contact portion.

In accordance with a fourth aspect, a method for manufacturing a fuel cell separator is provided that includes: a first step for applying a mixture of a resin and a first conductive substance onto a surface of a metal substrate to form an unhardened conductive resin layer; a second step for applying a second conductive substance onto a surface of the unhardened conductive resin layer; and a third step for hardening the unhardened conductive resin layer, wherein during the hardening, the metal substrate whose surface is covered is pressurized to force the resin into gaps between particles of the second conductive substance to cure the resin.

In the third step, the second conductive substance may be applied to part or all of the contact portion and the non-contact portion of the unhardened conductive resin layer. In this case, the second conductive substance adhering to the non-contact portion is removed between the fourth step and the fifth step.

In accordance with a fifth aspect, the second step includes a step for mixing the second conductive substance with a solvent, and applying the mixture onto the unhardened conductive resin layer formed in the first step, wherein the resin is hardly-soluble in the solvent.

In accordance with a sixth aspect, a method for manufacturing a fuel cell separator is provided that includes: a first step for applying a mixture of a first layer resin and a first layer conductive substance onto a surface of a metal substrate to form an unhardened first conductive resin layer; a second step for applying a mixture of a second layer resin and a second layer conductive substance onto a surface of the unhardened first conductive resin layer to form an unhardened second conductive resin layer, wherein the proportion of the second layer conductive substance in the second layer resin is higher than the proportion of the first layer conductive substance to the first layer resin; and a third step for hardening the unhardened first conductive resin layer and the unhardened second conductive resin layer.

In accordance with a seventh aspect, a method for manufacturing a fuel cell separator is provided that includes: a first step for applying a mixture of a sublayer resin and a sublayer conductive substance onto a surface of a metal substrate to form an unhardened conductive resin sublayer; a step for hardening the unhardened conductive resin sublayer; a second step for applying a mixture of a main-layer resin and a first conductive substance onto a surface of the conductive resin sublayer to form an unhardened conductive resin main layer, a third step for applying a second conductive substance onto a surface of the unhardened conductive resin main layer, and a fourth step for hardening the unhardened conductive resin main layer, wherein the metal substrate whose surface is covered is pressurized to force the main-layer resin into gaps between particles of the second conductive substance, and the main-layer resin is cured.

In accordance with an eighth aspect, the third step comprises a step for mixing the second conductive substance with a solvent, and applying the mixture onto the unhardened conductive resin sublayer formed in the first step, wherein the main-layer resin is hardly-soluble in the solvent.

In accordance with a ninth aspect, a method for manufacturing a fuel cell separator is provided that includes: a first step for applying a mixture of a sublayer resin and a sublayer conductive substance onto a surface of a metal substrate to form an unhardened conductive resin sublayer, a step for hardening the unhardened conductive resin sublayer; a second step for applying a main-layer resin onto a surface of the conductive resin sublayer to form an unhardened resin layer; a third step for applying a conductive substance onto a surface of the unhardened resin layer; and a fourth step for pressurizing the metal substrate, whose surface is covered, to force the main-layer resin contained in the unhardened resin layer into gaps between particles of the conductive substance to cure the resin, thereby forming a conductive resin main layer.

In accordance with a tenth aspect, the third step comprises a step for mixing the conductive substance with a solvent, and applying the mixture onto the unhardened conductive resin sublayer formed in the first step, wherein the main-layer resin is hardly-soluble in the solvent.

In accordance with an eleventh aspect, the metal substrate has a surface including a contact portion that contacts a gas diffusion layer or another separator in a fuel cell and a non-contact portion that cannot contact the gas diffusion layer or another separator and defines a water path. In the first step, the sublayer resin and the sublayer conductive substance are applied to the contact portion and the non-contact portion of the metal substrate. In the step for hardening the unhardened conductive resin sublayer, the unhardened conductive resin sublayer formed in the contact portion and the non-contact portion in the first step is hardened. In the second step, a mixture of a main-layer resin and a first conductive substance is applied onto the surface of the conductive resin sublayer in the contact portion and the non-contact portion to form an unhardened conductive resin main layer. In the third step, a second conductive substance is applied onto a portion of the unhardened conductive resin main layer formed in the second step, which portion covers the contact portion. In the fourth step, the metal substrate whose surface is covered is pressurized to force the main-layer resin in the portion covering the contact portion into gaps between particles of the second conductive substance, and then the main-layer resin is cured. After the fourth step, the method further comprises a fifth step for hydrophilizing a portion of the conductive resin main layer that covers the non-contact portion.

According to the first aspect, the contact resistance between the separator and a GDL and the contact resistance between the separator and another separator are reduced. As a result, the internal resistance of the fuel cell is reduced, and a reduction in cell voltage is suppressed, attaining a compact fuel cell with higher output.

According to the second aspect, the conductive resin sublayer covering the surface of the metal substrate prevents flow of metal ions from the metal substrate to ensure the contact resistance and significantly reduce elution of the metal from the metal substrate. Metal substrates having poor corrosion resistance can be used to reduce cost.

If the conductive resin main layer is provided directly on the surface of the metal substrate, the resin is forced into gaps between particles of the conductive substance covering the surface of the conductive resin layer by pressurization, and is cured.

If the conductive resin sublayer is not provided between the conductive resin main layer and the metal substrate, the resin in the vicinity of the metal substrate may move into the gaps between particles of the conductive substance covering the surface of the conductive resin main layer to cause defects on the surface of the metal substrate. These defects, if generated, may result in elution of metal ions from the metal substrate to reduce the corrosion resistance. The second aspect prevents these phenomena.

According to the third aspect, the conductive resin main layer in the non-contact portion has hydrophilicity, which efficiently discharges water droplets stagnating in the non-contact portion to the outside. The non-contact portion, which is not the contact portion in contact with the gas diffusion layer or another separator, is covered with the resin layer. For this reason, the corrosion resistance of the metal substrate is improved.

According to the fourth aspect, the method for manufacturing a fuel cell separator produces fuel cell separators at low cost with not only flat plate metal substrates but also metal substrates having surfaces with complicated grooves, applies conductive particles to these substrates sufficiently, reduces variations in the thickness of the layer, and also reduces the thickness of a conductive resin layer.

According to the fifth aspect, the resin in the conductive resin layer is hardly-soluble in the solvent for dispersing the second conductive substance. This prevents the movement of the resin in the conductive resin layer over the upper surface of the second conductive substance. For this reason, an increase in the contact resistance is suppressed to attain a fuel cell with higher output.

According to the sixth aspect, a fuel cell separator is readily produced in which the proportion of the conductive substance to the resin continuously increases from the metal substrate toward the surface of the separator.

According to the seventh aspect, even if the main-layer resin forming the conductive resin main layer moves to be forced into gaps between particles of the second conductive substance during pressurization, defects such as exposure of the surface of the metal substrate are suppressed because the surface of the metal substrate is covered with the hardened conductive resin sublayer in advance. This prevents elution of metal ions from the metal substrate. Furthermore, the surface of the conductive resin sublayer is covered with the conductive resin main layer, improving the corrosion resistance of the separator.

According to the eighth aspect, the main-layer resin is hardly-soluble in the solvent for dispersing the second conductive substance to suppress the movement of the main-layer resin over the upper surface of the second conductive substance and suppress an increase in the contact resistance. As a result, a fuel cell with higher output is attained.

According to the ninth aspect, even if the main-layer resin forming the conductive resin main layer moves to be forced into gaps between particles of the conductive substance during pressurization, defects such as exposure of the surface of the metal substrate are suppressed because the surface of the metal substrate is covered with the hardened conductive resin sublayer in advance. This prevents elution of metal ions from the metal substrate. Furthermore, the surface of the conductive resin sublayer is covered with the conductive resin main layer, improving the corrosion resistance of the separator.

According to the tenth aspect, the main-layer resin is hardly-soluble in the solvent for dispersing the conductive substance to suppress the movement of the main-layer resin over the upper surface of the conductive substance. This suppresses an increase in the contact resistance, thereby attaining a fuel cell with higher output.

According to the eleventh aspect, the conductive resin main layer in the non-contact portion has hydrophilicity, which attains a separator that efficiently discharges water droplets stagnating in the grooves to the outside. The conductive resin main layer also attains a separator having grooves with improved water discharging properties to attain improved gas diffusibility of the gas diffusion layer in the fuel cell. Since the non-contact portion is coated with a resin, a separator having improved corrosion resistance of the metal substrate is attained. Furthermore, since the surface of the conductive resin main layer covering the projections of the metal substrate contains the conductive substance, a separator having a reduced contact resistance between the separator and a gas diffusion layer (GDL) is attained.

BRIEF DESCRIPTION OF THE DRAWINGS

FIGS. 5A to 5D are explanatory views showing a method for manufacturing a fuel cell separator according to the first embodiment;

FIGS. 6A to 6D are explanatory views showing a method for manufacturing a fuel cell separator according to a second embodiment;

FIGS. 9A to 9(f) are explanatory views showing a method for manufacturing a fuel cell separator according to the third embodiment;

FIGS. 10A to 10(f) are explanatory views showing a method for manufacturing a fuel cell separator according to a fourth embodiment;

FIGS. 12A and 12B are explanatory views showing a method for manufacturing a fuel cell separator according to the fifth embodiment;

FIGS. 13A and 13B are explanatory views showing a method for manufacturing a fuel cell separator according to the fifth embodiment;

FIGS. 24A, 24B, and 24C are explanatory views showing a conventional method for manufacturing a metallic separator; and FIG. 25 is a cross-sectional view showing a metallic separator manufactured by a conventional method in another conventional example.

DETAILED DESCRIPTION OF THE PREFERRED EMBODIMENTS

Figure 1:
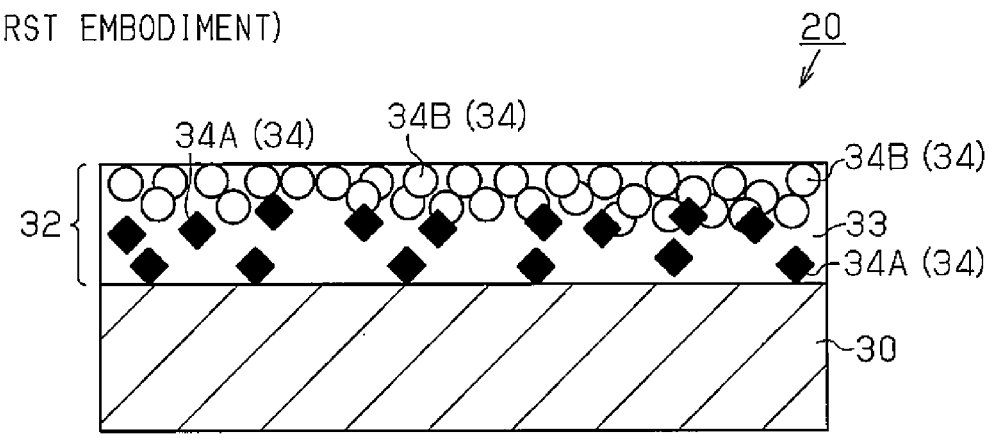
FIG. 1 is a cross-sectional view showing a fuel cell separator according to a first embodiment.

A fuel cell separator and a method for manufacturing a fuel cell separator according to the present invention will now be described with reference to FIGS. 1 to 10.

First, the configuration of a fuel cell including a fuel cell separator (hereinafter simply referred to as a separator) will be described with reference to FIG. 3.

First Example of Configuration of Fuel Cell

A fuel cell 10 has a stack structure of a plurality of laminated single cells 12. As shown in FIG. 3, the single cell 12 includes an anode assembly 13, a cathode assembly 14, and a solid polymer electrolyte membrane (hereinafter simply referred to as "electrolyte membrane") 15 located between the anode assembly 13 and the cathode assembly 14.

A membrane electrode assembly (MEA) 18 is composed of an electrolyte membrane 15, an anode 16A of the anode assembly 13, and a cathode 16B of the cathode assembly 14. The electrolyte membrane 15 is located between the anode 16A and the cathode 16B. The anode 16A functions as a fuel electrode and the cathode 16B functions as an oxygen electrode.

The anode assembly 13 includes the anode 16A and an anode gas flow path 17 formed between the anode 16A and a separator 20A. A fuel gas (hydrogen gas) flows through the anode gas flow path 17. As shown in FIG. 3, the separator 20A has a plurality of projections 22 for electrically contacting the anode 16A. Each of the projections 22 has a top surface 22b to contact the anode 16A. Grooves 22a are formed between adjacent projections 22. The grooves 22a and the anode 16A define the anode gas flow path 17 through which fuel gas can flow. The cathode assembly 14 includes the cathode 16B and a cathode gas flow path 19 formed between the cathode 16B and a separator 20B. Oxidizing agent gas (air) flows through the cathode gas flow path 19. The separator 20B has a plurality of projections 24 for electrically contacting the cathode 16B. Each of the projections 24 includes a top surface 24b to contact the cathode 16B. Grooves 24a are formed between adjacent projections 24. The grooves 24a and the cathode 16B define the cathode gas flow path 19 through which the oxidizing agent gas (air) flows.

Figure 3:
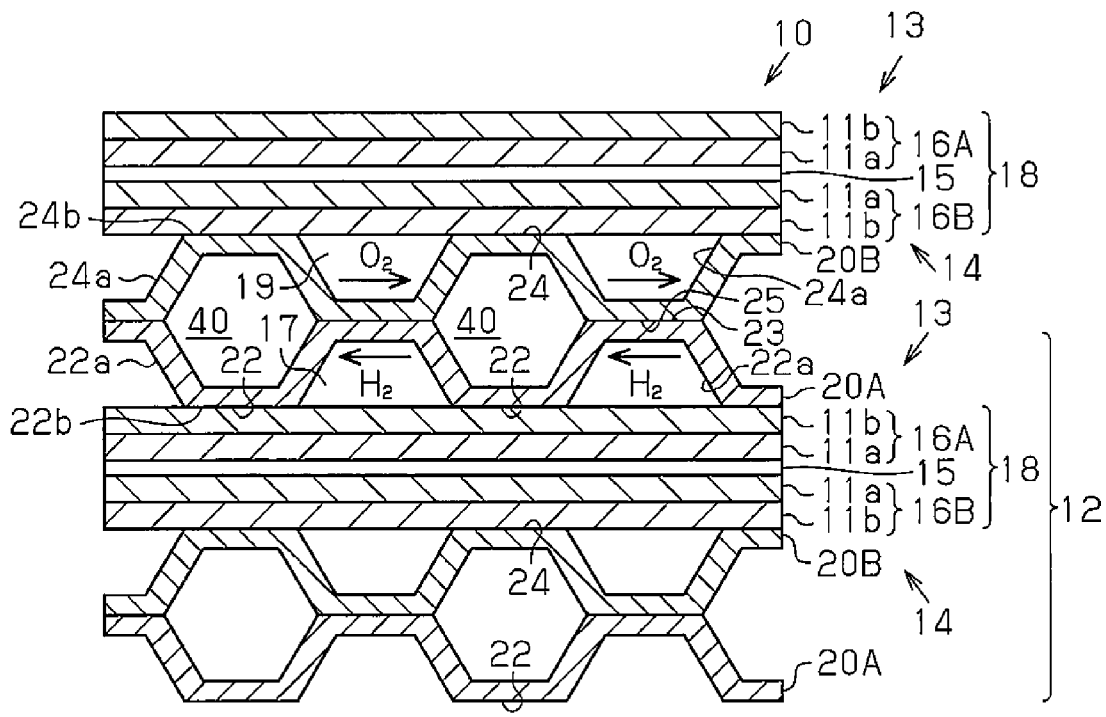
FIG. 3 is a cross-sectional view showing a single cell included in a fuel cell.

As shown in FIG. 3, the back sides of the grooves 22a in the separator 20A are projected in the opposite direction to the projections 22 to form projections 23 having top surfaces. The back sides of the grooves 24a in the separator 20B are projected in the opposite direction to the projections 24 to form projections 25 having top surfaces. The separators 20A and 20B electrically contact each other between the top surfaces of the projections 23 and the corresponding top surfaces of the projections 25. Grooves are formed between the projections 23 and between the projections 25.

The electrolyte membrane 15 is formed of a solid polymer material having high proton conductivity in a wet state.

The anode 16A and the cathode 16B are each composed of an electrode catalyst layer 11a and a gas diffusion layer (GDL) 11b. The electrode catalyst layer 11a is in contact with the electrolyte membrane 15. The electrode catalyst layer 11a is composed of conductive carbon black supporting platinum fine particles, for example. The gas diffusion layer 11b is laminated on the electrode catalyst layer 11a. The gas diffusion layer 11b is composed of a carbon paper, or a carbon cloth or a carbon felt composed of carbon fibers, for example. In FIG. 3, spaces formed between the projections 22 of the separator 20A and the projections 24 of the separator 20B define a cooling flow path 40 through which a cooling medium such as water flows. That is, the cooling flow path 40 is defined by the grooves formed between the projections 23 and the grooves formed between the projections 25.

Second Example of Configuration of Fuel Cell

Figure 4:
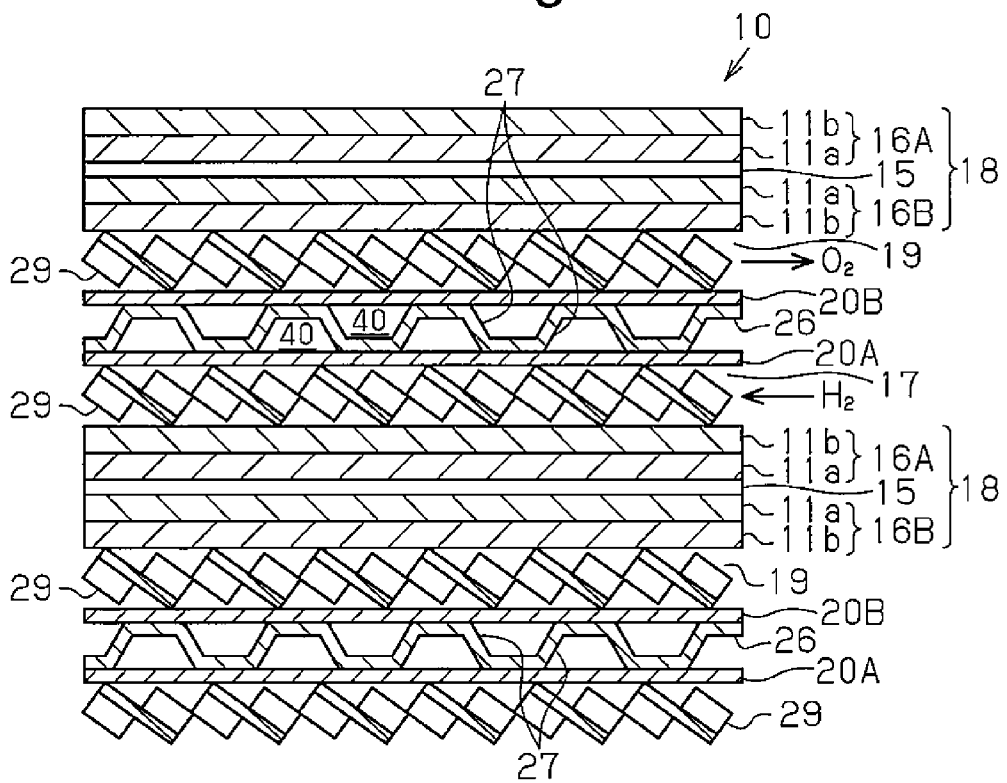
FIG. 4 is a cross-sectional view showing a single cell included in another fuel cell.

Next, a second example of the configuration of a fuel cell will be described with reference to FIG. 4. The same reference numerals will be given to the same or corresponding components as those in the first example of the configuration, and components different from those in the first example of the configuration will be described. As shown in FIG. 4, in the second example of the configuration, separators 20A and 20B are formed as flat plates. A cooling water plate 26 is located between the separators 20A and 20B. The cooling water plate 26 has a plurality of alternating upward and downward projections 27. The projections 27 of the cooling water plate 26 contact the separators 20A and 20B. Spaces formed between the separator 20A and the cooling water plate 26 and spaces formed between the separator 20B and the cooling water plate 26 define a cooling flow path 40 through which a cooling medium such as water flows. A porous member 29 of a metal material or a conductive material is located between the separator 20A and the gas diffusion layer 11b of the anode 16A and between the separator 20B and the gas diffusion layer 11b of the cathode 16B. The porous member 29 electrically connects the separator 20A to the gas diffusion layer 11b of the anode 16A and the separator 20B to the gas diffusion layer 11b of the cathode 16B.

First Embodiment

Next, the separator 20A and the separator 20B used in the fuel cell as described above will be described with reference to FIGS. 1 and 2.

In the first embodiment, the separators 20A and 20B have the same configuration, and will now be described as a separator 20. A metal substrate 30 used in the separator 20 is composed of a metal material having conductivity, such as stainless steel, steel, copper, titanium, aluminum, and nickel. The metal substrate 30 preferably has a thickness of 0.03 mm to 1 mm. For the purposes of illustration, the separator 20 is illustrated as a flat plate in FIG. 1. The separator 20, when used in the first example of the configuration of the fuel cell, has projections 22 to 25 shown in FIG. 3. For the purposes of illustration, the ratio of the thickness of the metal substrate 30 to the thickness of the conductive resin layer 32 shown in FIG. 1 is different from the actual ratio.

As shown in FIG. 1, at least one surface of the metal substrate 30 (one surface for an end metal substrate 30 of the stack structure) has a conductive resin layer 32 composed of a mixture of a resin 33 and a conductive substance 34. The resin 33 used in the conductive resin layer 32 is composed of an insulating resin that is selected from thermosetting resin, reaction-curable resin, and thermoplastic resin.

Examples of the thermosetting resin include phenol resin, amino resin, unsaturated polyester resin, epoxy resin, polyurethane, diallyl phthalate, silicone resin, and alkyd resin.

Examples of the reaction-curable resin include urethane resin, polyacrylate, photo-curable resin such as ultraviolet-light curable resin, silicone rubber, and reaction-curable elastomer such as isobutylene.

Examples of the thermoplastic resin include general-purpose plastic, general-purpose engineering plastic, super engineering plastic, fluorinated resin, super high molecular weight polyethylene, thermoplastic elastomer, polymethylpentene, biodegradable plastic, polyacrylonitrile, and cellulose plastic.

Examples of the general-purpose plastic include polyethylene, polystyrene, AS resin, ABS resin, polypropylene, vinyl chloride resin, polyvinylidene chloride, polyvinyl alcohol, polyethylene vinyl alcohol, methacrylic resin, and polyethylene terephthalate. Examples of general-purpose engineering plastic include polyamide, polycarbonate, polyacetal, modified polyphenylene ether, and polybutylene terephthalate. Examples of the super engineering plastic include polyphenylene sulfide, polyacrylate, polysulfone, polyether sulfone, polyether ether ketone, polyether imide, polyamide-imide, liquid crystal polymer, polyimide, and polyphthalamide.

The conductive substance 34 is composed of a conductive ceramic, a carbon material, or a metal material. Examples of the conductive ceramic include alumina-titanium-carbide ceramic, conductive zirconia ceramic, and silicon carbide ceramic.

The conductive substance 34 may be a powdery carbon material, and examples thereof include graphite (artificial graphite, natural graphite), carbon black, and exfoliated graphite. The conductive substance 34 may be a fibrous carbon material, and examples thereof include carbon nanotubes, carbon nanofibers, and carbon fibers. These carbon nanotubes and carbon nanofibers have a diameter of 0.001 to 0.5 μm, preferably 0.003 to 0.2 μm and a length of 1 to 100 μm, preferably 1 to 30 μm from the viewpoint of conductivity.

The conductive substance 34 may be a powdery or fibrous metal carbide, and examples thereof include tungsten carbide, silicon carbide, tantalum carbide, titanium carbide, niobium carbide, molybdenum carbide, vanadium carbide, chromium carbide, and hafnium carbide. The conductive substance 34 may be a powdery or fibrous metal oxide, and examples thereof include titanium oxide, zinc oxide, ruthenium oxide, indium oxide, and tin oxide. The conductive substance 34 may be a powdery or fibrous metal nitride, and examples thereof include tantalum nitride, titanium nitride, molybdenum nitride, chromium nitride, aluminum nitride, zirconium nitride, gallium nitride, niobium nitride, vanadium nitride, and boron nitride.

The conductive substance 34 may be a powdery metal, and examples thereof include powders of copper, aluminum, zinc, titanium, nickel, tin, silver, tantalum, and niobium. The conductive substance 34 may be a fibrous metal, and examples thereof include iron fibers, copper fibers, and stainless steel fibers.

Figure 2:
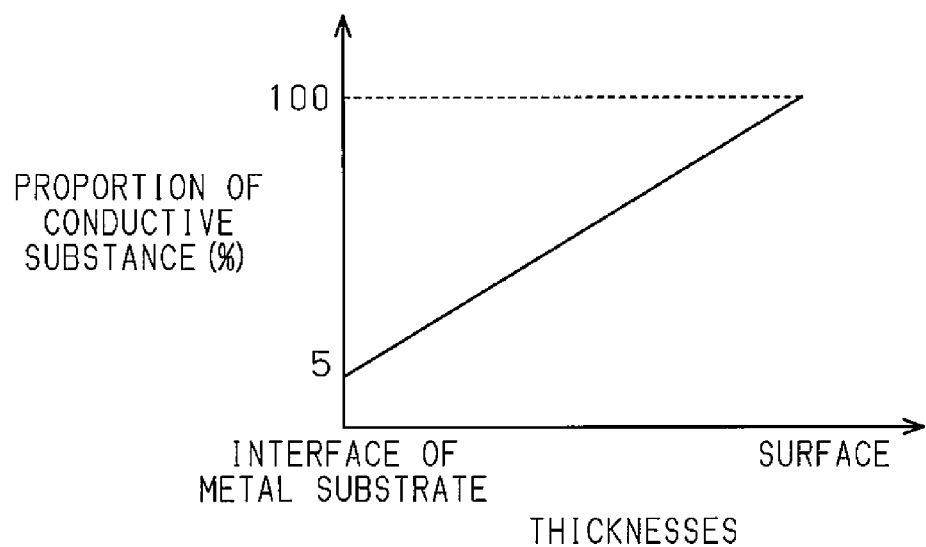
FIG. 2 is an explanatory view showing the proportion of a conductive substance (conductive particles) in a conductive resin layer.

Characteristic features of the first embodiment include the fact that, as shown in FIG. 2, the proportion of the conductive substance 34 to the resin continuously increases from the metal substrate 30 (interface of the metal substrate) toward the surface of the separator. In the first embodiment, the proportion of the conductive substance 34 to the resin 33 on the surface of the conductive resin layer 32 is 100%, and the proportion of the conductive substance 34 to the resin 33 at the interface of the metal substrate is about 5%. The proportion of the conductive substance 34 on the surface of the conductive resin layer 32 is not necessarily limited to 100%, but is preferably a proportion close to 100%. The proportion of the conductive substance 34 at the interface of the metal substrate is 5% in the first embodiment, but not limited to 5%. A preferred proportion is at least a few percentages or more. FIG. 2 shows a straight line indicating the proportion of the conductive substance 34 from the interface of the metal substrate to the surface of the separator, but not limited to the straight line. The proportion may be changed to be expressed with any line such as a concave curve curving downward or a convex curve curving upward as long as the proportion of the conductive substance 34 increases continuously, i.e., monotonously from the interface of the metal substrate to the surface of the separator.

In the first embodiment, the separator has a large amount of the carbon conductive substance 34 in the vicinity of the surface of the separator.

The conductive resin layer 32 has a thickness of 1 to 350 µm, preferably 2 to 100 µm. When a powdery conductive substance is used, the upper limit of the weight average particle size thereof (determined by laser diffraction scattering) is preferably 20 µm or less, more preferably 15 µm or less, and most preferably 10 µm or less. The lower limit of the weight average particle size of the powdery conductive substance is 0.01 µm or more, preferably 0.05 µm or more, most preferably 0.1 µm or more. When a fibrous conductive substance is used, the carbon nanotube and the carbon nanofiber described above are used, or a fiber having an upper limit of the diameter of 50 µm or less, preferably 20 µm or less and a lower limit of the diameter at a nano level is used. Preferably, the lower limit of the diameter of such a fiber is 1 µm or more, more preferably 5 µm or more. The length of the fiber is 1 to 10000 µm, preferably 5 to 1000 µm.

As shown in FIG. 1, the conductive resin layer 32 in the first embodiment may contain only one of the conductive substances described above or a combination of two or more of the substances as the conductive substance 34. A carbon conductive substance is preferably used alone or in combination with another conductive substance 34 in the vicinity of the surface of the conductive resin layer 32, but not limited to this usage. When a carbon conductive substance is used in combination with another conductive substance, the mixing ratio thereof can be determined as desired.

Method for Manufacturing Separator 20 According to First Embodiment

A method for manufacturing the thus-configured separator 20 will now be described with reference to FIGS. 5A to 5D.

First, the resin 33 and a first conductive substance 34A are mixed with a solvent in which the resin 33 and the first conductive substance 34A can be dispersed or dissolved to prepare a mixture, or a mixed solution (coating material), of the first conductive substance 34A and the resin 33. As the first conductive substance 34A, only one of the above-mentioned conductive ceramics, carbon materials, or metal materials can be used, or two or more of these materials can be used in combination. In use in combination, the mixing ratio can be determined as desired.

The first conductive substance 34A may be contained in the solvent in any proper content not to inhibit formation of a layer, which is performed later. The content of the first conductive substance 34A is lower than the content of a second conductive substance 34B adhering onto the surface of the conductive resin layer 32. Preferably, the density of the first conductive substance 34A is not significantly higher than the density of the solvent. A significantly high density of the first conductive substance 34A is not preferred for formation of the conductive resin layer 32 performed later. After the mixture is applied to the metal substrate 30, the conductive substance 34A sediments in the mixture. If the first conductive substance 34A has a significantly high density, the conductive substance 34A sediments so fast that the proportion of the conductive substance 34A to the resin 33 does not increase continuously from the interface of the metal substrate toward the surface of the resin layer. The amount and the type of the solvent may be controlled to prepare the viscosity of the solution, retarding the sedimentation of the conductive substance 34A.

The mixed solution (coating material) prepared as above is applied to one (or both) surface(s) of the metal substrate 30 shown in FIG. 5A. FIG. 5B shows the mixed solution applied to only one surface of the metal substrate 30. The resin and the first conductive substance are applied to the metal substrate 30 by any method such as spray coating, dipping, and electrodeposition.

FIGS. 5B to 5D show the conductive substance 34 existing in the conductive resin layer 32 after application of the mixed solution, i.e., a conductive substance 34A.

Next, a second conductive substance 34B is mixed with a solvent in a proper ratio in which the second conductive substance 34B can be dispersed. Preferably, the solvent does not dissolve the resin 33 contained in the conductive resin layer 32. For the second conductive substance 34B, the above-mentioned conductive substances can be used. Preferably, one of those carbon conductive substances may be used alone or in combination with another conductive substance.

Next, the prepared mixed solution (coating material) of the second conductive substance 34B dispersed in a dispersing solvent without a resin is applied onto the surface of an unhardened conductive resin layer 32 as shown in FIG. 5C. Thereby, the entire or substantially entire surface of the conductive resin layer 32 is covered with the second conductive substance 34B. The second conductive substance is applied to the conductive resin layer 32 by a non-limiting method such as spray coating, dipping, and electrodeposition.

The dispersing solvent for dispersing the second conductive substance 34B without a resin is preferably a solvent that hardly dissolves the resin mixed with the first conductive substance 34A. That is, preferably the resin is hardly-soluble in the dispersing solvent for dispersing the second conductive substance 34B.

Non-limiting examples of the dispersing solvent for dispersing the second conductive substance 34B without a resin will be listed below.

When the resin for the conductive resin layer 32 to be used is a polar resin such as phenol resin and epoxy resin, the dispersing solvent to be used is a solvent that hardly dissolves the polar resin. Examples of such a solvent include benzene, ethylbenzene, cumene, normal hexane, cyclohexane, ethyl acetate, propyl acetate, diethyl ether, tetrahydrofuran, dioxane, ethylene glycol diethyl ether, carbon tetrachloride, and chloroform.

Thus, the surface of the conductive resin layer 32 is covered with the second conductive substance 34B. As a result, the proportion of the second conductive substance 34B to the resin on the surface of the conductive resin layer 32 is higher than the proportion of the first conductive substance 34A to the resin in the conductive resin layer 32.

When the resin for the conductive resin layer 32 to be used is a thermosetting resin, after the application, the pressure is applied while the metal substrate 30 having the surface covered with the second conductive substance 34B is being heated. Thereby, the second conductive substance 34B is forced into the unhardened conductive resin layer 32, and the resin is cured. The heating temperature at this time is a temperature for curing the thermosetting resin. Examples of the method of applying pressure under heating include methods with a hot press, methods of applying pressure with a belt press while heating is being performed with a heating means, or methods of applying pressure with a roll press while heating is being performed with a heating means.

When the resin for the conductive resin layer 32 is a reaction-curable resin or a thermoplastic resin, the pressure is applied before curing to force the second conductive substance 34B into the unhardened conductive resin layer 32. The pressure is applied by a method using a cold press, a belt press, or a roll press.

For example, when the resin is a curable resin and the unhardened conductive resin layer 32 is pressed while being heated by a hot press, the resin 33 is forced into gaps between particles of the powdery or fibrous second conductive substance 34B (such as a carbon conductive substance), and then is cured.

When the resin is a reaction-curable resin or a thermoplastic resin, the resin is cured by a typical method. The pressure is applied during or before curing of the resin to force the second conductive substance 34B into the unhardened conductive resin layer 32. The resin is cured after the resin 33 is forced into gaps between particles of the powdery or fibrous second conductive substance 34B (such as carbon conductive substance).

Thus the surface of the conductive resin layer 32 is covered with the second conductive substance 34B, so that the proportion of the second conductive substance 34B to the resin in the vicinity of the surface of the separator 20 is higher than the proportion of the first conductive substance 34A to the resin, the first conductive substance 34A being dispersed in the conductive resin layer 32.

When the resin is a thermosetting resin, the resin is pressed with a hot press or the like. Alternatively, when the resin is a thermoplastic resin or a reaction-curable resin, the resin is pressed with a cold press or the like. Thereby, the resin is cured in the state where the first conductive substance 34A in the conductive resin layer 32 is moved toward the interface of the metal substrate. Thereby, the first conductive substance 34A is restrained by the cured resin.

As a result, the proportion of the conductive substance 34 (34A, 34B) continuously increases from the interface of the metal substrate toward the surface of the separator.

Accordingly, the conductive resin layer 32 is finally composed of a portion containing the first conductive substance 34A in a lower proportion in the thickness direction and a portion formed by forcing the resin into gaps between particles of the second conductive substance 34B. After formation of the conductive resin layer 32, the particles of the second conductive substance 34B that are not restrained by the resin are washed off by high pressure washing or ultrasonic washing, for example. The washing step may be omitted if all of the particles of the applied second conductive substance 34B are restrained by the resin.

The formation of the conductive resin layer 32 on one surface of the metal substrate 30 has been described. The conductive resin layer 32 may be formed on both surfaces of the metal substrate 30 in the same manner.

Operation of First Embodiment

When the thus-configured separator 20 is used in the fuel cell 10 in the first example of the configuration shown in FIG. 3 and the fuel cell 10 in the second example of the configuration shown in FIG. 4, the surface of the separator contacting the gas diffusion layer (GDL) 11b can sufficiently ensure a conductive path. The proportion of the conductive substance in the conductive resin layer 32 continuously increases from the interface of the metal substrate toward the surface of the separator 20. This configuration prevents an increase in the interface resistance at the interface between the portion having the first conductive substance 34A and the portion having the second conductive substance 34B mainly, and also reduces the specific resistance. For this reason, the contact resistance between the separator 20 and other members (GDL, another separator) is significantly reduced. This configuration can sufficiently ensure the conductive path on the surface of the separator 20. Accordingly, the interface resistance and the specific resistance are also reduced in the fuel cell 10 when the separator 20 is connected with another separator having the same conductive resin layer.

The first embodiment attains the following advantages:

(1) In the separator according to the first embodiment, the proportion of the conductive substance 34 (34A, 34B) to the resin continuously increases from the metal substrate 30 toward the surface of the separator. As a result, the contact resistance can be reduced when the separator is connected to a GDL or another separator to reduce the internal resistance of the fuel cell and increase the cell voltage. A compact fuel cell with higher output can be attained.

(2) The method for manufacturing a separator according to the first embodiment comprises a first step for applying a mixture of a resin and the first conductive substance 34A onto one (or both) surface(s) of the metal substrate 30 to form an unhardened conductive resin layer 32, a second step for applying a second conductive substance 34B without a resin onto the unhardened conductive resin layer 32 formed in the first step, and a third step for hardening the unhardened conductive resin layer. In the third step, the metal substrate whose surface is covered with the unhardened conductive resin layer 32 is pressurized during curing to force the resin 33 into gaps between particles of the second conductive substance 34B applied without a resin.

As a result, the manufacturing method according to the first embodiment produces the fuel cell separator at low cost with not only flat plate metal substrates but also metal substrates having surfaces with complicated grooves, applies conductive particles to these substrates sufficiently, reduces the thickness of the conductive resin layer, and reduces variations in the thickness of the layer. That is, the manufacturing method according to the first embodiment readily forms the conductive resin layer 32 even in a separator having complicated projections 22 to 25, which is used in the first example of the configuration of the fuel cell 10. Since the mixed solution (coating material) is applied only twice, variations in the thickness of the layer are reduced to attain a thinner layer. Unlike the first conventional method described in, in which a conductive resin sheet is prepared, and is bonded to a metal substrate, the manufacturing method according to the first embodiment does not need such a process, and reduces costs.

(3) According to the method for manufacturing a separator according to the first embodiment, the dispersing solvent for dispersing the second conductive substance 34B without a resin is a solvent that hardly dissolves the resin mixed with the first conductive substance 34A. As a result, according to the first embodiment, since the solvent for dispersing the second conductive substance 34B hardly dissolves the resin for the conductive resin layer 32, the resin is prevented from moving over the upper surface of the second conductive substance, suppressing an increase in the contact resistance. As a result, a fuel cell with higher output can be attained.

If the solvent for the mixed solution readily dissolves the resin for the conductive resin layer 32, the resin in the conductive resin layer 32 may be dissolved into the solvent to move over the upper surfaces of the second conductive substance 34B. In this case, the resin remaining after volatilization of the dispersing solvent may increase the contact resistance because the resin has insulating properties.

The manufacturing method according to the first embodiment avoids such phenomena and thus increases the proportion of the conductive substance to the resin on the surface of the conductive resin layer 32.

Second Embodiment

Next, a separator according to a second embodiment will be described with reference to FIG. 6.

For the purposes of illustration, the same reference numerals will be given to the same or corresponding components as those in the first embodiment.

As shown in FIG. 6D, in the separator 20 according to the second embodiment, a metal substrate 30 has the same configuration as that in the separator according to the first embodiment. For the purposes of illustration, the separator 20 is illustrated as a flat plate in FIG. 6. The separator 20 used in First example of the configuration of the fuel cell has projections 22 to 25. For the purposes of illustration, the ratio of the thickness of the metal substrate 30 to the thickness of the conductive resin layers 32A and 32B shown in FIG. 6 is different from the actual ratio.

As shown in FIG. 6D, on at least one surface of the metal substrate 30 (one surface for an end metal substrate 30 of the stack structure), a first conductive resin layer 32A composed of a mixture of a first layer resin 35A and a first layer conductive substance 36A is formed. FIG. 6D illustrates the conductive resin layers 32A and 32B formed on one surface of the metal substrate 30 for the purposes of illustration.

The first layer resin 35A used in the first conductive resin layer 32A is composed of insulating resin that is selected from thermosetting resin, reaction-curable resin, and thermoplastic resin described in the first embodiment. The first layer conductive substance 36A is composed of a conductive ceramic, a carbon material, or a metal material described in the first embodiment.

On the surface of the first conductive resin layer 32A, the second conductive resin layer 32B composed of a mixture of a second layer resin 35B and a second layer conductive substance 36B is formed. The second layer resin 35B used in the second conductive resin layer 32B is composed of insulating resin that is selected from thermosetting resin, reaction-curable resin, and thermoplastic resin described in the first embodiment. The type of the second layer resin contained in the second conductive resin layer 32B is preferably the same as that of the first layer resin contained in the first conductive resin layer 32A. For example, when the first layer resin contained in the first conductive resin layer 32A is a thermosetting resin, the second layer resin contained in the second conductive resin layer 32B is preferably the same thermosetting resin. When the first layer resin contained in the first conductive resin layer 32A is a thermoplastic resin, the second layer resin contained in the second conductive resin layer 32B is preferably the same thermoplastic resin.

The second layer conductive substance 36B is composed of a conductive ceramic, a carbon material, or a metal material described in the first embodiment.

In the second embodiment, the proportion of the first layer conductive substance 36A to the first layer resin 35A in the first conductive resin layer 32A is higher than the proportion of the second layer conductive substance 36B to the second layer resin 35B in the second conductive resin layer 32B. That is, when the proportion of the conductive substance to the resin in the second conductive resin layer 32B is higher than that in the first conductive resin layer 32A, the conductive substance continuously increases from the metal substrate 30 (interface of the metal substrate) toward the surface of the separator.

For example, on the surface of the conductive resin layer 32 (surface of the second conductive resin layer 32B), the proportion of the second layer conductive substance 36B is 80 to 90%. In the vicinity of the interface of the metal substrate (first conductive resin layer 32A), the proportion of the first layer conductive substance 36A is about 5%. The proportion of the conductive substance 36B on the surface of the conductive resin layer 32, which is not necessarily 80 to 90%, is higher than the proportion of the first layer conductive substance 36A in the first conductive resin layer 32A.

The proportion of the first layer conductive substance 36A in the vicinity of the interface of the metal substrate (first conductive resin layer 32A) is 5% in the second embodiment but not limited to 5%. A preferred proportion is at least a few percentages or more. In the vicinity of the interface between the first conductive resin layer 32A and the second conductive resin layer 32B, the proportion of the conductive substance to the resin is continuous. That is, the viscosities of the solutions for forming the first conductive resin layer 32A and the second conductive resin layer 32B are prepared through tests or the like such that the distribution of the second layer conductive substance 36B sedimented in an unhardened second conductive resin layer 32B is the same or substantially same as the distribution of the first layer conductive substance 36A on the surface of the unhardened first conductive resin layer 32A (interface of the second conductive resin layer 32B).

The first layer resin 35A contained in the first conductive resin layer 32A and the second layer resin 35B contained in the second conductive resin layer 32B may be different, and are preferably of the same type. That is, preferably the first conductive resin layer 32A and the second conductive resin layer 32B are both a thermosetting resin or a thermoplastic resin.

The thicknesses of the first and second conductive resin layers 32A and 32B are 1 to 350 µm, preferably 6 to 200 µm. In the second embodiment, the first and second layer conductive substances 36A and 36B, which are contained in the first and second conductive resin layers 32A and 32B, respectively, may be one of the conductive substances described in the first embodiment or a combination of two or more of these conductive substances.

Method for Manufacturing Separator 20 According to Second Embodiment

Next, a method for manufacturing the separator 20 according to the second embodiment will be described with reference to FIG. 6.

First, the first layer resin 35A and the first layer conductive substance 36A are mixed with a solvent in which the first layer resin 35A and the first layer conductive substance 36A can be dispersed or dissolved. A mixture of the first layer conductive substance 36A and the first layer resin 35A, namely, a mixed solution (coating material) is prepared. For the first layer conductive substance 36A, one of those conductive ceramics, carbon materials, or metal materials described above is used, or two or more of these materials are used in combination. In use in combination, the mixing ratio is determined as desired.

The first layer conductive substance 36A may be contained in the solvent in any proper content not to inhibit formation of the layer, which is performed later. The content thereof is lower than the content of the second layer conductive substance 36B. Preferably, the density of the first layer conductive substance 36A is not significantly higher than the density of the solvent. A significantly high density of the first layer conductive substance 36A is not preferred for formation of the first conductive resin layer 32A performed later. After the mixture is applied to the metal substrate 30, the first layer conductive substance 36A sediments in the mixture. If the first layer conductive substance 36A has a significantly high density, the first layer conductive substance 36A sediments so fast that the proportion of the first layer conductive substance 36A to the first layer resin 35A does not continuously increase from the interface of the metal substrate toward the surface of the resin layer. The amount and the type of the solvent may be controlled to adjust the viscosity of the solution, retarding the sedimentation of the first layer conductive substance 36A.

The mixed solution (coating material) prepared as above is applied onto one (or both) surface(s) of the metal substrate 30 shown in FIG. 6A to form an unhardened first conductive resin layer 32A. FIG. 6B shows the mixed solution applied to only one surface of the metal substrate 30. The resin and the conductive substance are applied to the metal substrate 30 by any method such as spray coating, dipping, and electrodeposition.

Next, the second layer resin 35B and the second layer conductive substance 36B are mixed with a solvent in which the second layer resin 35B and the second layer conductive substance 36B can be dispersed or dissolved. A mixture of the second layer conductive substance 36B and the second layer resin 35B, namely, a mixed solution (coating material) is prepared. The mixed solution may be prepared in advance before formation of unhardened first conductive resin layer 32A.

The second layer conductive substance 36B is one of the above-mentioned conductive ceramic, carbon material, and metal material, or a combination of two or more of these materials. In use in combination, the mixing ratio is determined as desired. The proportion of the second layer conductive substance 36B to the solvent and the second layer resin 35B is higher than the proportion of the first layer conductive substance 36A contained in the first conductive resin layer 32A. Preferably, the density of the second layer conductive substance 36B is not significantly higher than the density of the solvent.

The proportion of the second layer conductive substance 36B to the second layer resin 35B is higher than the proportion of the first layer conductive substance 36A to the first layer resin 35A, so that the proportion of the conductive substance to the resin continuously increases from the interface of the metal substrate toward the surface of the resin layer.

The mixed solution (coating material) of the second layer resin 35B and the second layer conductive substance 36B prepared as above is applied onto the surface of the unhardened conductive resin layer 32A shown in FIG. 6B. The second layer resin 35B and the second layer conductive substance 36B are applied onto the surface of the first conductive resin layer 32A by any method such as spray coating, dipping, and electrodeposition.

After the second layer resin 35B and the second layer conductive substance 36B are applied onto the surface of the unhardened first conductive resin layer 32A as shown in FIG. 6C by the above application method, the resin, if it is a thermosetting resin, is heated and pressurized with a hot press, or is pressurized with a belt press while being heated with a heating means (heater) to be cured to form a second conductive resin layer 32B. Alternatively, the resin is pressurized with a roll press while being heated with a heating means (heater) to be cured to form a second conductive resin layer 32B. When the second layer resin 35B is a thermoplastic resin or a reaction-curable resin, the resin 35B is pressurized with a cold press, a belt press, or a roll press without heating to be cured to form a hardened second conductive resin layer 32B as shown in FIG. 6D.

In the unhardened first conductive resin layer 32A, the first layer conductive substance 36A sediments before the curing of the resin. Thereby, the proportion thereof to the first layer resin 35A in the first conductive resin layer 32A continuously increases toward the surface of the resin layer.

In the unhardened second conductive resin layer 32B, the second layer conductive substance 36B sediments before the curing of the resin. Thereby, the proportion thereof to the second layer resin 35B in the second conductive resin layer 32B continuously increases toward the surface of the resin layer. Thus, the surface of the first conductive resin layer 32A is covered with the conductive resin layer 32B such that the proportion of the conductive substance in the resin is higher than that in the first conductive resin layer 32A.

Thus, the separator 20 is configured such that the proportion of the conductive substance to the resin continuously increases from the interface of the metal substrate toward the surface of the resin layer.

The second embodiment has the following characteristic features.

(1) In the fuel cell separator according to the second embodiment, the proportion of the second layer conductive substance 36B to the second layer resin 35B in the second conductive resin layer 32B is higher than the proportion of the first layer conductive substance 36A to the first layer resin 35A in the first conductive resin layer 32A in the vicinity of the interface of the metal substrate 30, and continuously increases from the interface of the metal substrate toward the surface of the separator. As a result, the contact resistance to a GDL or another separator is reduced to reduce the internal resistance of the fuel cell and increase the cell voltage. A compact fuel cell with higher output can be attained.

(2) In the method for manufacturing a fuel cell separator according to the second embodiment, in a first step, a mixture of the first layer resin 35A and the first layer conductive substance 36A is applied onto one (or both) surface(s) of the metal substrate 30 to form an unhardened first conductive resin layer. Next, in a second step, a mixture of the second layer resin 35B and the second layer conductive substance 36B is applied onto the unhardened first conductive resin layer 32A formed in the first step to form an unhardened second conductive resin layer. At this time, the proportion of the second layer conductive substance 36B to the second layer resin 35B is higher than the proportion of the first layer conductive substance 36A to the first layer resin 35A. In a third step in the method for manufacturing a fuel cell separator, the unhardened first and second conductive resin layers formed in the first and second steps are hardened. As a result, a fuel cell separator can be readily produced such that the proportion of the conductive substance to the resin continuously increases from the metal substrate toward the surface of the separator.

Third Embodiment

Next, a separator 20 and a method for manufacturing the separator according to a third embodiment will be described with reference to FIGS. 7 to 9. In the separator 20 according to the third embodiment, different components from those in the separator 20 according to the first embodiment will be described. The same reference numerals will be given to the same or corresponding components as those in the first embodiment and the description thereof will be omitted.

Unlike the first embodiment, the separator 20 according to the third embodiment includes a conductive resin sublayer 42 between a metal substrate 30 and a conductive resin layer 32. In the third embodiment, the conductive resin layer 32 is referred to as a conductive resin main layer 32. A conductive resin sublayer 42 contains a sublayer resin 45 and a sublayer conductive substance 44 dispersed in the sublayer resin 45. The sublayer resin 45 contained in the conductive resin sublayer 42 may be the same as or different from a resin 33 contained in the conductive resin main layer 32 (referred to as a main-layer resin 33 in the third embodiment). The sublayer resin 45 used in the conductive resin sublayer 42 is selected from the resins described in the first embodiment. The sublayer conductive substance 44 distributed in the conductive resin sublayer 42 may be one of the conductive substances described in the first embodiment or a combination of two or more of the substances.

The conductive resin sublayer 42 may have a thickness corresponding to the size of the sublayer conductive substance 44. That is, when a powdery sublayer conductive substance 44 is used, the conductive resin sublayer 42 may have a thickness corresponding to the weight average particle size of the sublayer conductive substance 44. When a fibrous sublayer conductive substance 44 is used, the conductive resin sublayer 42 may have a thickness substantially corresponding to the diameter of a fiber as the sublayer conductive substance 44. Alternatively, when the sublayer conductive substance 44 forms aggregates, the conductive resin sublayer 42 has a thickness substantially corresponding to the size of the aggregate.

Figure 8:
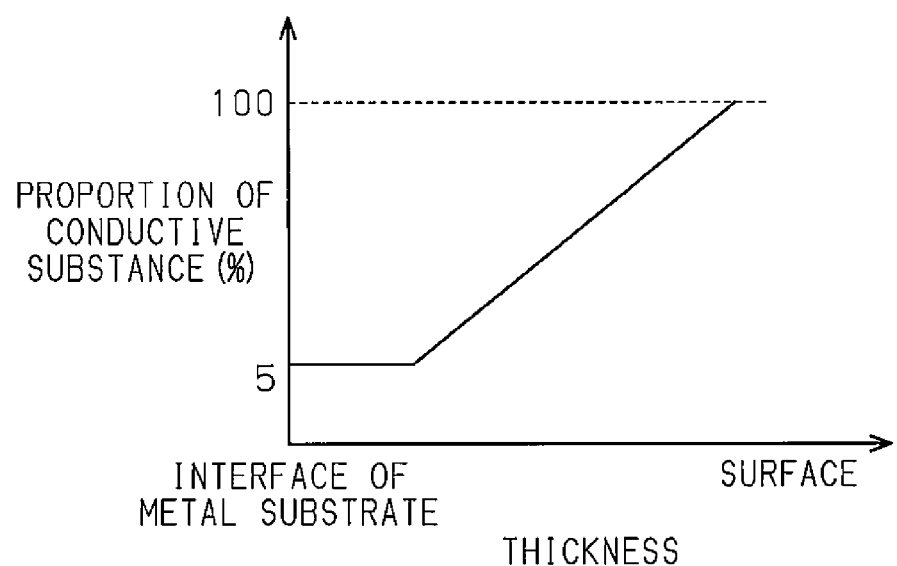
FIG. 8 is an explanatory view showing the proportion of the conductive substance (conductive particles) in the conductive resin main layer and the conductive resin sublayer.

For this reason, in the third embodiment, the conductive resin sublayer 42 contains the conductive substance (sublayer conductive substance 44) in a fixed proportion to the resin (sublayer resin 45) as shown in FIG. 8.

As shown in FIG. 8, in the conductive resin main layer 32, the proportion of the conductive substance to the resin (main-layer resin 33) continuously increases from the interface of the conductive resin sublayer 42 toward the surface of the conductive resin main layer. In the third embodiment, the proportion of the conductive substance on the surface of the conductive resin main layer 32 is 100%, and the proportion of the conductive substance at the interface of the metal substrate is about 5%. The proportion of the conductive substance on the surface of the conductive resin main layer 32 is not necessarily 100%, and preferably is a proportion close to 100%. The proportion of the conductive substance at the interface of the metal substrate is 5% in the third embodiment, but not limited to 5%. A preferred proportion is at least a few percentages or more. FIG. 8 shows a straight line indicating the proportion of the conductive substance from the vicinity of the interface of the metal substrate to the surface of the separator, but not limited to the straight line. The proportion may be changed to be expressed with any line such as a concave curve curving downward or a convex curve curving upward as long as the proportion of the conductive substance increases continuously and monotonously from the vicinity of the interface of the metal substrate to the surface of the separator.

Method for Manufacturing Separator 20 According to Third Embodiment

The method for manufacturing the separator 20 according to the third embodiment will now be described with reference to FIGS. 9A to 9(f).

First, the sublayer resin 45 and the sublayer conductive substance 44 are mixed with a solvent in which the sublayer resin 45 and the sublayer conductive substance 44 can be dispersed or dissolved to prepare a mixture of the sublayer conductive substance 44 and the sublayer resin 45, namely, a first mixed solution (coating material). For the conductive substance 44, one of the above-mentioned conductive ceramics, carbon materials, or metal materials can be used, or two or more of these materials can used in combination. In use in combination, the mixing ratio can be determined as desired. The conductive substance 44 may be contained in the solvent in any proper content not to inhibit formation of a layer, which is performed later.

The mixed solution (coating material) prepared as above is applied to one (or both) surface(s) of the metal substrate 30 shown in FIG. 9A.

FIG. 9B shows the mixed solution applied to only one surface of the metal substrate 30. The resin and the conductive substance are applied to the metal substrate 30 by any method such as spray coating, dipping, and electrodeposition. The layer formed has a thickness corresponding to the size of the sublayer conductive substance 44 as described above. That is, when a powdery sublayer conductive substance 44 is used, a layer having a thickness corresponding to the weight average particle size of the sublayer conductive substance 44 is formed. When a fibrous sublayer conductive substance 44 is used, a layer having a thickness corresponding to the diameter of a fiber as the sublayer conductive substance 44 is formed. Alternatively, when the conductive substance 44 forms aggregates, a layer having a thickness corresponding to the size of the aggregate is formed. FIG. 9B is an explanatory view showing a first step.

Subsequent to the first step, as shown in FIG. 9C, when the sublayer resin 45 to be used is a thermosetting resin, the sublayer resin 45 is heated and pressurized with a hot press or is pressurized with a belt press while being heated with a heating means (heater) to be cured to form a conductive resin sublayer 42. Alternatively, a sublayer resin 45 is pressurized with a roll press while being heated with a heating means (heater) to be cured to form a conductive resin sublayer 42. Alternatively, a sublayer resin 45 is heated with a heating means (heater) to be cured to form a conductive resin sublayer 42. When the sublayer resin 45 to be used is a thermoplastic resin or a reaction-curable resin, the sublayer resin 45 is pressurized with a cold press, a belt press, or a roll press without heating to be cured to form a conductive resin sublayer 42.

Next, the main-layer resin 33 and the first conductive substance 34 are mixed with a solvent in which the main-layer resin 33 and the first conductive substance 34A can be dispersed or dissolved. A mixture of the first conductive substance 34A and the main-layer resin 33, namely, a second mixed solution (coating material) is prepared. For the conductive substance 34, one of the above-mentioned conductive ceramic, carbon material, or metal material is used, or two or more of these materials are used in combination. In use in combination, the mixing ratio can be determined as desired. The first conductive substance 34A and main-layer resin 33 can be contained in any proper content not to inhibit formation of a layer, which is performed later. For example, the content of the conductive substance is 0 to 50% by weight. The upper limit value of the content of the first conductive substance 34A is not limited to 50% by weight, and may be determined according to the degree of the second conductive substance 34B forced into the conductive resin main layer 32.

Preferably, the density of the first conductive substance 34A is not significantly higher than the density of the solvent. A significantly high density of the first conductive substance 34A is not preferred in formation of the conductive resin main layer 32 performed later. After the application of the mixture, the conductive substance 34A sediments in the mixture. If the first conductive substance 34A has a significantly high density, the first conductive substance 34A sediments so fast that the proportion of the first conductive substance 34A does not continuously increase from the interface of the metal substrate toward the surface of the separator. The amount and the type of the solvent may be controlled to prepare the viscosity of the solution, retarding the sedimentation of the first conductive substance 34A.

Preferably, the main-layer resin 33 is of the same type as that of the sublayer resin 45 in the conductive resin sublayer 42. For example, when the main-layer resin 33 to be used is a thermosetting resin, the same thermosetting resin is preferably used as the sublayer resin 45 in the conductive resin sublayer 42. When the main-layer resin 33 to be used is a thermoplastic resin, the same thermoplastic resin is preferably used as the sublayer resin 45 in the conductive resin sublayer 42.

The second mixed solution (coating material) prepared as above is applied onto the surface of the conductive resin sublayer 42 as shown in FIG. 9D. In FIG. 9D, for the purposes of illustration, description is performed assuming that the conductive resin sublayer 42 is formed on one surface of the metal substrate 30. The application method is the same as that in the first embodiment, but not limited to this. FIG. 9D is an explanatory view showing a second step.

Next, a proper amount of the second conductive substance 34B is added to a solvent in which the second conductive substance 34B can be dispersed. Preferably, the solvent does not dissolve the main-layer resin 33 in the conductive resin main layer 32. The second conductive substance 34B may be the conductive substance described in the first embodiment. Preferably, one of those carbon conductive substances is used alone or in combination with another conductive substance.

Next, the mixed solution (coating material) prepared as above by dispersing the second conductive substance 34B in the solvent without using a resin is applied onto the surface of the unhardened conductive resin main layer 32 shown in FIG. 9(e) to cover the entire or substantially entire surface of the conductive resin main layer 32 with the second conductive substance 34B. The application method is the same as that in the first embodiment but not limited to this. The dispersing solvent for dispersing the second conductive substance 34B without using a resin is preferably a solvent that hardly dissolves the main-layer resin. That is, preferably the main-layer resin is hardly-soluble in the dispersing solvent for dispersing the second conductive substance 34B. FIG. 9(e) is an explanatory view showing a third step.

Subsequent to the third step, when the main-layer resin 33 to be used is a thermosetting resin in the metal substrate 30 whose surface is covered with the second conductive substance 34B as shown in FIG. 9(f), the resin is heated and pressurized with a hot press, or is pressurized with a belt press while being heated with a heating means (heater) to harden the conductive resin main layer 32. Alternatively, the resin is pressurized with a roll press while being heated with a heating means (heater) to harden the conductive resin main layer 32. At this time, the heating temperature is a temperature for curing the main-layer resin 33. When the main-layer resin 33 to be used is a thermoplastic resin or a reaction-curable resin, the resin is pressurized with a cold press, a belt press, or a roll press without heating to harden the conductive resin main layer 32. FIG. 9(f) is an explanatory view showing a fourth step.

When the unhardened conductive resin main layer 32 is pressurized with a hot press or a cold press, for example, the main-layer resin 33 is forced into gaps between particles or fibers of powdery or fibrous conductive substance 34B (such as a carbon conductive substance), and is cured.

Thus, the surface of the conductive resin main layer 32 is covered with the second conductive substance 34B. After the main-layer resin 33 is forced into the gaps between particles of the second conductive substance 34B, the proportion of the second conductive substance 34B to the resin in the vicinity of the surface of the conductive resin main layer 32 is still higher than the proportion of the first conductive substance 34A to the resin, the first conductive substance 34A being dispersed in the conductive resin main layer 32.

The first conductive substance 34A in the conductive resin main layer 32 moves toward the interface of the metal substrate by the pressurization and are restrained by the curing of the main-layer resin 33.

Thereby, the proportion of the conductive substance 34 (34A, 34B) continuously increases from the interface of the conductive resin sublayer 42 toward the surface of the separator.

Accordingly, the conductive resin main layer 32 is finally composed of a portion containing the first conductive substance 34A in a lower proportion in the thickness direction and a portion formed by forcing the main-layer resin into gaps between particles of the second conductive substance 34B. After formation of the conductive resin main layer 32, the particles of the second conductive substance 34B that are not restrained by the main-layer resin 33 are washed off by high pressure washing or ultrasonic washing, for example.

The washing step may be omitted if all of the particles of the applied second conductive substance 34B are restrained by the resin.

Operation of Third Embodiment

The thus-configured separator 20 has the same operation as that of the first embodiment and the following action.

In the first embodiment, if the resin is pressurized with a pressing means (such as a hot press and a cold press above) before the resin is cured, an uncured resin in the conductive resin main layer 32 is forced into gaps between particles of the second conductive substance 34B, and is cured. At this time, the resin in contact with the surface of the metal substrate 30 may move toward the surface of the separator to cause defects. When such a separator is used in the fuel cell, metal ions in the metal substrate 30 may elute to the defected sites to reduce corrosion resistance. In contrast, in the third embodiment, when the resin 33 contained in the conductive resin main layer 32 is pressurized by a pressing means, the sublayer resin in the conductive resin sublayer 42 is already cured, and the resin in contact with the metal substrate 30 does not move. The conductive resin sublayer 42 thus prevents the occurrence of defects in the vicinity of the surface of the metal substrate 30 to improve the corrosion resistance of the separator.

The third embodiment attains the following advantages.

(1) The separator according to the third embodiment includes the hardened conductive resin sublayer 42 located between the conductive resin main layer 32 and the metal substrate 30. The conductive resin sublayer 42 prevents elution of the metal ions in the metal substrate 30. The conductive resin sublayer 42 is composed of the resin 45 and the conductive substance 44 dispersed therein.

In the separator 20 according to the third embodiment, the surface of the metal substrate 30 is covered with the hardened conductive resin sublayer 42. For this reason, defects such as exposure of the surface of the metal substrate 30 are prevented to prevent elution of metal ions from the metal substrate 30. Accordingly, the separator according to the third embodiment ensures the contact resistance and significantly reduces the elution of the metal from the metal substrate. As a result, the life of the fuel cell is increased. Metal substrates having low corrosion resistance can be used, reducing cost.

(2) The method for manufacturing a separator according to the third embodiment comprises a first step for applying a mixture of the sublayer resin 45 and the sublayer conductive substance 44 to one (or both) surface(s) of the metal substrate 30 to form an unhardened conductive resin sublayer 42, and a stage of hardening the conductive resin sublayer 42 formed in the first step. The manufacturing method further comprises a second step for applying a mixture of the main-layer resin 33 and the first conductive substance 34A onto the surface of the conductive resin sublayer 42 to form an unhardened conductive resin main layer 32, and a third step for applying the second conductive substance 34B to the conductive resin main layer 32 formed in the second step without a resin.

The manufacturing method further comprises a fourth step for pressurizing the metal substrate whose surface is covered to force the uncured main-layer resin 33 into gaps between particles of the second conductive substance 34B applied without a resin, and curing the main-layer resin 33.

As a result, according to the manufacturing method according to the third embodiment, even if the main-layer resin 33 forming the conductive resin main layer 32 moves toward, for example, the gaps between particles of the second conductive substance 34B (conductive substance) during pressurization, defects such as exposure of the surface of the metal substrate 30 are prevented because the surface of the metal substrate 30 is already covered with the hardened conductive resin sublayer 42. For this reason, the separator suppresses elution of metal ions from the metal substrate 30. Furthermore, the corrosion resistance of the separator is improved because the surface of the conductive resin sublayer 42 is covered with the conductive resin main layer 32.

(3) In the method for manufacturing a separator according to the third embodiment, the dispersing solvent for dispersing the second conductive substance 34B without a resin is a solvent that hardly dissolves the main-layer resin 33 contained in the conductive resin main layer 32 compared to the solvent of the second mixed solution. As a result, according to the third embodiment, the movement of the resin 33 contained in the conductive resin main layer 32 over the upper surface of the second conductive substance 34B is prevented during the application of the mixed solution in which the second conductive substance 34B is dispersed. Thereby, an increase in the contact resistance of the separator is suppressed. As a result, a fuel cell with higher output is attained.

If the solvent for dispersing the second conductive substance 34B readily dissolves the main-layer resin 33 in the conductive resin main layer 32 (for example, the same solvent as the solvent of the second mixed solution), the main-layer resin 33 may be dissolved from the conductive resin main layer 32 into the solvent and move over the upper surface of the second conductive substance 34B. The resin 33 remaining on the upper surface of the second conductive substance 34B after volatilization of the dispersing solvent may increase the contact resistance because the main-layer resin 33 has insulating properties.

The manufacturing method according to the third embodiment avoids such phenomena to increase the proportion of the conductive substance in the conductive resin main layer 32, particularly the proportion of the conductive substance on the surface thereof.

Fourth Embodiment

The separator 20 and the method for manufacturing the separator according to a fourth embodiment will now be described with reference to FIG. 10. In the fourth embodiment, different components from those in the separator 20 according to the third embodiment will be described. The same reference numerals will be given to the same or corresponding components as those in the third embodiment and the description thereof will be omitted.

As shown in FIG. 10(*f*), the separator 20 according to the fourth embodiment has the same configuration as that of the separator according to the third embodiment except that the separator 20 according to the fourth embodiment does not include the first conductive substance 34A in the conductive resin main layer 32 in the separator 20 according to the third embodiment. In the separator 20 according to the third embodiment shown in FIG. 9(*f*), for the purposes of illustration, to describe the first conductive substance 34A, a first conductive substance 34A thicker than the conductive resin main layer 32 in the separator 20 according to the fourth embodiment shown in FIG. 10(*f*) is shown.

The characteristic features of the fourth embodiment include that, in the conductive resin main layer 32, the second conductive substance 34B continuously increases from the interface of the conductive resin sublayer 42 toward the surface of the separator. Like the third embodiment, the thickness of the conductive resin sublayer 42 corresponds to the weight average particle size of the sublayer conductive substance 44 when a powdery sublayer conductive substance 44 is used, and corresponds to the diameter of a fiber as the sublayer conductive substance 44 when a fibrous sublayer conductive substance 44 is used. Alternatively, when the sublayer conductive substance 44 forms aggregates, the conductive resin sublayer 42 has a thickness substantially corresponding to the size of the aggregate. For this reason, the conductive resin sublayer 42 has a constant proportion of the conductive substance to the resin.

In the conductive resin main layer 32, the proportion of the second conductive substance 34B to the main-layer resin 33 continuously increases from the interface of the conductive resin sublayer 42 toward the surface of the separator 20. In the fourth embodiment, the proportion of the conductive substance 34B is 100% on the surface of the conductive resin main layer 32, and the proportion of the sublayer conductive substance 44 in the vicinity of the interface of the metal substrate is about 5%. The proportion of the conductive substance on the surface is not necessarily 100%, and preferably is a proportion close to 100%. In the fourth embodiment, the proportion of the sublayer conductive substance 44 in the vicinity of the interface of the metal substrate is 5%, but not limited to 5%. A preferred proportion is at least a few percentages or more. In the fourth embodiment, the proportion of the conductive substance from the interface of the metal substrate to the surface of the separator changes a linear, convex, or concave manner. In short, the proportion of the conductive substance may increase from the interface of the metal substrate to the surface of the separator continuously or monotonously.

Method for Manufacturing Separator 20 According to Fourth Embodiment

Next, the method for manufacturing the separator 20 according to the fourth embodiment will be described with reference to FIGS. 10A to 10(*f*). The steps or stages in FIGS. 10A to 10C are the same as those in the manufacturing method according to the third embodiment described with reference to FIGS. 9A to 9C, and the description thereof will be omitted. That is, a conductive resin sublayer 42 is formed on a metal substrate 30 in the same manner as in the third embodiment.

In the manufacturing method according to the third embodiment, the main-layer resin 33 and the first conductive substance 34A are applied onto the surface of the conductive resin sublayer 42 to form an unhardened conductive resin main layer 32. In the fourth embodiment, as shown in FIG. 10D, a main-layer resin 33 is applied onto the surface of the conductive resin sublayer 42 to form a resin layer 32C.

That is, the main-layer resin 33 is added to a solvent in which the main-layer resin 33 can be dispersed or dissolved. A mixed solution (coating material) thereof is prepared. In the fourth embodiment, the mixed solution corresponds to the second mixed solution. The main-layer resin 33 may be contained in the solvent in any proper content not to inhibit formation of a layer, which is performed later.

The mixed solution (coating material) prepared as above is applied onto the surface of the conductive resin sublayer 42 as shown in FIG. 10D. In FIG. 10D, for the purposes of illustration, the description is performed assuming that the conductive resin sublayer 42 is formed on one surface of the metal substrate 30. The application method is the same as that in the first embodiment, but not limited to this. The mixed solution is applied to form an unhardened resin layer 32C.

Next, a step for applying a conductive substance 34B to the resin layer 32C without a resin is the same as the step for applying the second conductive substance 34B to the conductive resin main layer 32 in the third embodiment (see FIG. 9(*e*)), and the description will be omitted.

That is, the entire or substantially entire surface of the resin layer 32C is covered with the conductive substance 34B (third step). The application method is the same as that in the first embodiment, but not limited to this. The dispersing solvent for dispersing the conductive substance 34B without a resin is preferably a solvent that hardly dissolves the main-layer resin 33. That is, preferably the main-layer resin 33 is hardly-soluble in the dispersing solvent for dispersing the conductive substance 34B.

Subsequent to the third step, in a fourth step, when a thermosetting resin as the main-layer resin 33 is used for the metal substrate 30 whose surface is covered with the conductive substance 34B, the resin is heated and pressurized with a hot press or the like to harden the resin layer 32C as in the fourth step in the third embodiment. At this time, the conductive substance 34B is forced into the resin layer 32C to form a hardened conductive resin main layer 32. When the resin 33 is a thermoplastic resin or a reaction-curable resin, the resin is pressurized with a cold press or the like without heating, and the conductive resin layer 32 is hardened by a typical method.

When the metal substrate 30 having a covered surface is pressurized with a hot press or the like, or a cold press or the like, the main-layer resin 33 is forced into gaps between particles or fibers of powdery or fibrous conductive substance 34B (such as a carbon conductive substance 34B), and is cured.

The hardened conductive resin main layer 32 is thus formed, and the conductive substance 34B over the conductive resin main layer 32 is dispersed in the resin layer 32C to form a conductive resin main layer 32.

Due to sedimentation of the conductive substance 34B and the pressurization of the metal substrate, the proportion of the conductive substance 34B continuously increases from the interface of the conductive resin sublayer 42 toward the surface of the separator.

As a result, the conductive resin main layer 32 finally has a configuration with a portion formed by forcing the main-layer resin into gaps between particles of the conductive substance 34B. Subsequently, the particles of the conductive substance 34B that are not restrained by the main-layer resin are washed off by high pressure washing or ultrasonic washing, for example. The washing step can be omitted if all of the particles of the applied conductive substance 34B are restrained by the resin.

Operation of Fourth Embodiment

Also in the fourth embodiment, the conductive resin sublayer 42 is formed and is hardened in advance. For this reason, the sublayer resin in the conductive resin sublayer 42 is not moved even if pressurized with a pressing means when the main-layer resin 33 in the conductive resin main layer 32 is not cured yet. As a result, the occurrence of defects of coating films is prevented by the conductive resin sublayer 42 to improve corrosion resistance.

The fourth embodiment attains the following advantages.

(1) The separator according to the fourth embodiment includes the conductive resin sublayer 42 between the conductive resin main layer 32 and the metal substrate 30. The conductive resin sublayer 42 prevents elution of metal ions from the metal substrate 30. The conductive resin sublayer 42 contains the sublayer conductive substance 44 dispersed in the sublayer resin 45. As a result, the separator 20 according to the fourth embodiment has the same advantages as described in (1) in the third embodiment.

(2) The method for manufacturing a separator according to the fourth embodiment comprises a first step for applying a mixture of the sublayer resin 45 and the sublayer conductive substance 44 onto one (or both) surface(s) of the metal substrate 30 to form an unhardened conductive resin sublayer 42, and a stage of hardening the conductive resin sublayer 42 formed in the first step. The manufacturing method further comprises a second step for applying the main-layer resin 33 onto the surface of the conductive resin sublayer 42 to form an unhardened resin layer 32C, and a third step for applying the conductive substance 34B (second conductive substance) onto the resin layer 32C formed in the second step without a resin. The manufacturing method further comprises a fourth step for pressurizing the metal substrate 30 having a covered surface to force the conductive substance 34B (second conductive substance) applied without a resin into the resin layer 32C, and curing the main-layer resin 33 to form a conductive resin main layer 32. As a result, the manufacturing method according to the fourth embodiment attains the same advantages as described in (2) in the third embodiment.

(3) In the method for manufacturing a separator according to the fourth embodiment, the dispersing solvent for dispersing the conductive substance 34B without a resin is a solvent that hardly dissolves the main-layer resin 33 compared to the solvent of the second mixed solution containing the main-layer resin. As a result, the fourth embodiment attains the same advantages as described in (3) in the third embodiment.

Fifth Embodiment

A fifth embodiment will now be described with reference to FIGS. 11 to 13.

The separator 20 according to the fifth embodiment, like the third embodiment, is used as the separators 20A and 20B illustrated in FIG. 3.

In the separator 20 according to the fifth embodiment, different components from those in the separator according to the third embodiment illustrated in FIG. 7 will be described. The same reference numerals will be given to the same or corresponding components as those in the third embodiment and the description thereof will be omitted. The separators 20A and 20B below have the same configuration. For the purposes of illustration, the configuration of the separator 20A will be described and that of the separator 20B will be omitted.

Figure 7:
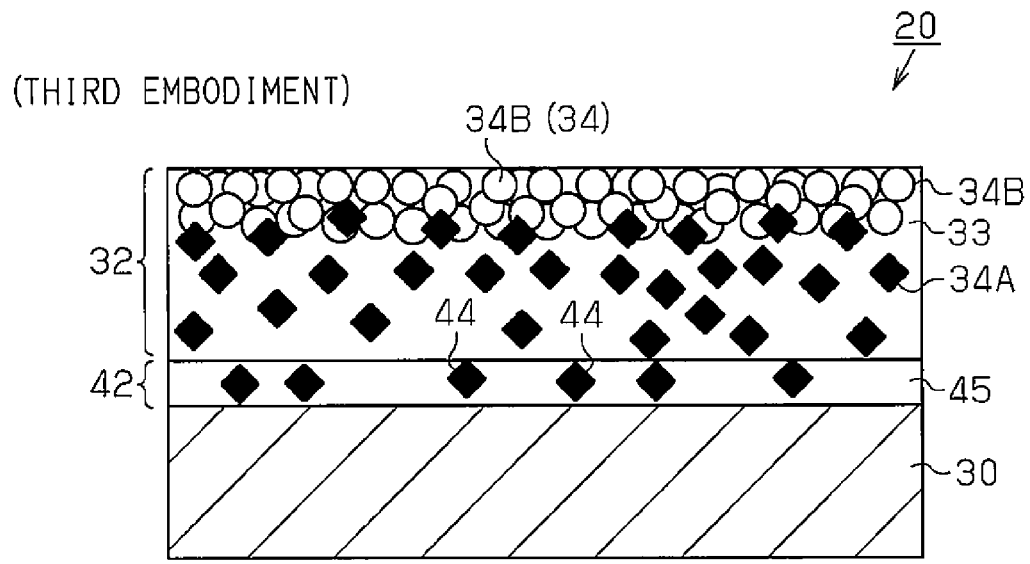
FIG. 7 is a cross-sectional view showing a fuel cell separator according to a third embodiment.

As shown in FIG. 7, the separator according to the third embodiment includes the conductive resin sublayer 42 laminated entirely on one (or both) surface(s) of the metal substrate 30 and the conductive resin main layer 32. In the separator according to the third embodiment, the conductive resin main layer 32 contains the main-layer resin 33, the first conductive substance 34A, and the second conductive substance 34B. The conductive resin sublayer 42 contains the sublayer resin 45 and the sublayer conductive substance 44.

The separator 20A according to the fifth embodiment also includes a conductive resin sublayer 42 laminated entirely on one (or both) surface(s) of a metal substrate 30 and a conductive resin main layer as shown in FIG. 13B. That is, the metal substrate 30 has the conductive resin sublayer 42 and the conductive resin main layer 32 on the surface of a projection 22 composed of a top surface 22b and surfaces for forming grooves 22a. For the purposes of illustration, in FIG. 13B, the separator 20A according to the fifth embodiment has the conductive resin sublayer 42 and the conductive resin main layer 32 provided only one surface of the metal substrate 30.

In the separator 20A according to the fifth embodiment, a sublayer conductive substance 44 is dispersed in the conductive resin sublayer 42 and a first conductive substance 34A is dispersed in the conductive resin main layer 32.

The top surface 22b of the projection 22 is a contact portion in contact with a gas diffusion layer 11b. Surfaces for forming grooves 22a are non-contact portions.

Unlike the third embodiment, in the separator 20A according to the fifth embodiment, the second conductive substance 34B is dispersed and fixed in the conductive resin main layer 32 and on the surface of the conductive resin main layer 32 in the region of the top surface of the projection 22 while the second conductive substance 34B is not present on the surfaces for forming grooves 22a.

Unlike the third embodiment, regions of the main-layer resin 33 covering the surfaces for forming grooves 22a are hydrophilic. For this reason, the main-layer resin 33 itself may be composed of a hydrophilic resin. In this case, the main-layer resin 33 preferably also has water resistance.

Alternatively, the surface of the region may be hydrophilized to give hydrophilicity to the main-layer resin 33. Examples of hydrophilization include plasma treatment, corona discharge treatment, and ultraviolet light irradiation treatment. Such a hydrophilic resin 33 efficiently discharges water droplets stagnating in the grooves 22a to the outside.

Method for Manufacturing Separator 20 According to Fifth Embodiment

One example of the method for manufacturing the separator 20 according to the fifth embodiment will now be described with reference to FIGS. 11 and 12.

Figure 11A:
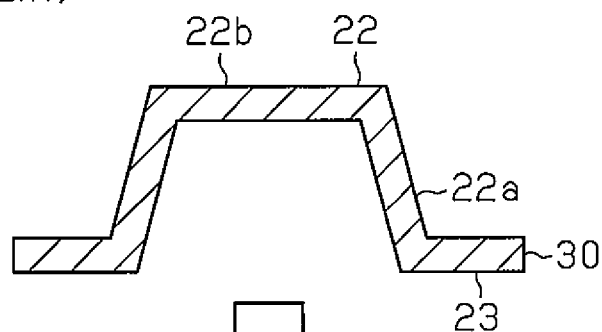
FIGS. 11A to 11C are explanatory views showing a method for manufacturing a fuel cell separator according to a fifth embodiment.
Figure 11B:
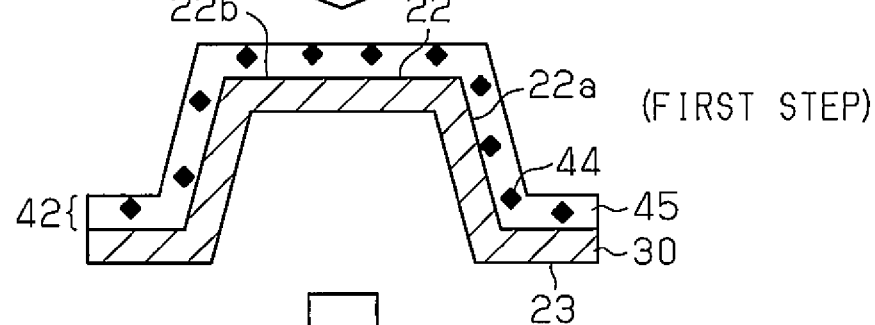
Figure 11C:
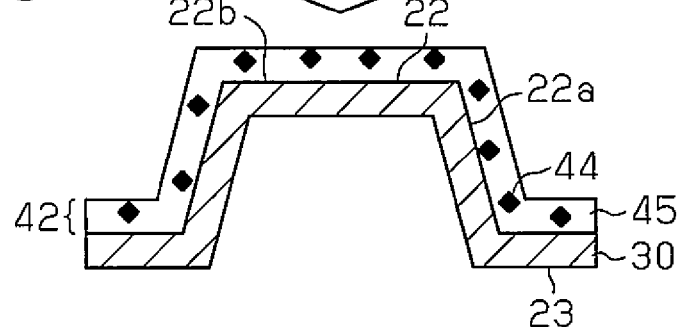

The steps shown in FIGS. 11A to 11C each correspond to the steps shown in FIGS. 9A to 9C in the third embodiment, and the description thereof will be omitted. FIG. 11B is a diagram showing a first step.

Through the steps in FIGS. 9A to 9C, a conductive resin sublayer 42 having dispersed sublayer conductive substance 44 is formed on the top surface and the surfaces for forming grooves 22a in the projection 22 of the metal substrate 30 as shown in FIG. 9C.

FIG. 12A shows a second step that is the same as the second step in the third embodiment shown in FIG. 9D. The description is the same as in the third embodiment, and will be omitted.

Through the second step, the conductive resin main layer 32 composed of the main-layer resin 33 and the first conductive substance 34A dispersed in the main-layer resin 33 is laminated onto the conductive resin sublayer 42. In FIGS. 12A, 12B, 13A, and 13B, the conductive resin main layer 32 is thinner than the conductive resin sublayer 42 for simplicity of illustration, although the conductive resin main layer 32 actually formed is thicker than the conductive resin sublayer 42 similarly to the conductive resin main layer 32 in the third embodiment.

After the second step, in a third step, as shown in FIG. 12B, the same second conductive substance 34B (such as carbon black) as in the third embodiment is applied to an uncured main-layer resin 33 on the top surface of the projection 22 with a coating means 50 such as a roll coater. Alternatively, the same second conductive substance 34B is applied onto the uncured main-layer resin 33 with a coating means such as a spray.

FIG. 13A is an explanatory view showing a fourth step. As shown in FIG. 13A, when a thermosetting resin as the resin 33 is used for the metal substrate 30 having a covered surface, the resin is heated and pressurized with a hot press or is pressurized with a belt press while being heated with a heating means (heater) to harden the conductive resin main layer 32. Alternatively, the resin is pressurized with a roll press while being heated with a heating means (heater) to harden the conductive resin main layer 32. At this time, the heating temperature is a temperature for curing the resin. When the resin 33 is a thermoplastic resin or a reaction-curable resin, the resin is pressurized with a cold press, a belt press, or a roll press without heating to harden the conductive resin main layer 32. At this time, the second conductive substance 34B is forced into the conductive resin main layer 32 in the contact portion, and the main-layer resin 33 is forced into gaps between particles of the second conductive substance 34B, and is cured.

Next, FIG. 13B is an explanatory view showing a fifth step. As shown in FIG. 13B, the surfaces of the portions of the conductive resin main layer 32 covering the surfaces for forming grooves 22a are hydrophilized by hydrophilizing treatment. When the hydrophilization is performed by irradiation such as plasma treatment, corona discharge treatment, or ultraviolet light irradiation treatment, the resin 33 covering the top surface 22b is covered with the conductive substance 34B and is prevented from being hydrophilized. Accordingly, the conductive resin main layer 32 covering the surfaces for forming grooves 22a is selectively hydrophilized.

Between the fourth step and the fifth step, the particles of the second conductive substance 34B that are not restrained by the resin may be washed off by high pressure washing or ultrasonic washing, for example. The washing step may be omitted if all of the particles of the applied second conductive substance 34B are restrained by the resin. When the second conductive substance 34B is applied to portions other than the top surface of the projection 22 with a coating means such as a spray, the particles of the second conductive substance 34B that are not restrained by the resin should be removed by a washing method as above, for example.

Although the method for manufacturing the separator 20A has been described as above, the separator 20B can be manufactured in the same manner.

Operation of Fifth Embodiment

In the fifth embodiment, portions of the conductive resin main layer 32 covering the regions of the surfaces for forming grooves 22a are hydrophilic. For this reason, a fuel cell provided with the separator efficiently discharges water droplets stagnating in the grooves 22a to the outside. As a result, water discharging properties are improved to improve the gas diffusibility of the gas diffusion layer 11b in the fuel cell.

The regions of the projections other than the regions thereof in contact with the gas diffusion layer 11b, namely, the grooves 22a and the grooves 24a are coated with the resin layer to improve the corrosion resistance of the metal substrate 30. The second conductive substance 34B is present on the surface of the conductive resin main layer 32 covering the projections 22 and 24 of the metal substrate 30, and reduces the contact resistance between the separator and the gas diffusion layer 11b.

When two separators each provided with the conductive resin sublayer 42 and the conductive resin main layer 32 on both surfaces of the metal substrate 30 are electrically contacted, the contact resistance between the projections 23 and 25 shown in FIG. 3 is reduced.

The fifth embodiment attains the following advantages.

(1) The fuel cell separator according to the fifth embodiment includes the metal substrate 30 whose one surface is provided with the projections 22 or 24. The top surfaces 22b or 24b (contact portions) thereof are each in contact with the gas diffusion layer 11b or another separator in the fuel cell. The separator has surfaces for forming grooves 22a or 24a (non-contact portions), which cannot contact the gas diffusion layer 11b or another separator and define a water path. The separator includes the conductive resin sublayer 42 and the conductive resin main layer 32. The conductive resin main layer 32 contains the main-layer resin 33 and the first conductive substance 34A dispersed in the main-layer resin 33. The second conductive substance 34B is provided on the surface of the conductive resin main layer 32 corresponding to the top surfaces 22b or 24b (contact portions) of the projections 22 or 24. The portions of the main-layer resin 33 in the conductive resin main layer 32 covering the surfaces for forming grooves 22a or 24a (non-contact portions) are hydrophilic.

As a result, according to the fifth embodiment, the fuel cell provided with the separator efficiently discharges water droplets stagnating in the grooves to the outside because of the hydrophilic portions of the main-layer resin 33 in the conductive resin layer 32 covering the regions of the surfaces for forming grooves. As a result, water discharging properties are improved to improve the gas diffusibility of the gas diffusion layer 11b in the fuel cell to thereby improve the cell properties.

The grooves 22a and 24a are coated with the resin layer to improve the corrosion resistance of the metal substrate. The second conductive substance 34B, which is provided on the surface of the conductive resin main layer 32 covering the projections of the metal substrate, reduces the contact resistance between the separator and the gas diffusion layer 11b.

When two separators each provided with the conductive resin sublayer and the conductive resin main layer on both surfaces of the metal substrate are electrically contacted, the contact resistance between the projections can be reduced.

As a result, a low contact resistance is maintained, and elution of metal ions can be significantly reduced, attaining a fuel cell having a longer life.

(2) The separator according to the fifth embodiment includes the metal substrate 30 whose one surface is provided with the projections 22 or 24. The top surfaces 22b (contact portions) thereof are each in contact with the gas diffusion layer 11b or another separator in the fuel cell. The separator according to the fifth embodiment also includes the surfaces for forming grooves 22a or 24a (non-contact portions) which cannot contact the gas diffusion layer 11b or another separator and define a water path.

In the first step, the sublayer resin 45 and the sublayer conductive substance 44 are applied onto the top surfaces 22b (contact portions) and surfaces for forming grooves 22a and 24a (non-contact portions) of the projections 22 and 24 to form unhardened conductive resin sublayers. Next, the conductive resin sublayer 42 formed on the contact portions and the non-contact portions in the first step is hardened.

In the second step, a mixture of the main-layer resin 33 and the first conductive substance 34A is applied onto the surfaces of the conductive resin sublayers 42 on the top surfaces 22b (contact portions) and the surfaces for forming grooves 22a and 24a (non-contact portions) of the projections 22 and 24 to form the unhardened conductive resin main layers 32. In the third step, the second conductive substance 34B is applied without a resin to the portions of the conductive resin main layer 32 on the top surfaces 22b (contact portions) of the projections 22 and 24. The second conductive substance 34B may be applied to portions of the conductive resin main layer 32 other than the top surfaces thereof. In this case, the second conductive substance 34B should be removed after the fourth step. In the subsequent fourth step, the metal substrate 30 having a covered surface is pressurized to force the second conductive substance 34B, which is applied without a resin to the conductive resin main layer 32, into the conductive resin main layer 32, and the conductive resin main layer 32 is hardened. After the fourth step, in the fifth step, the portions of the conductive resin main layer 32 covering the surfaces for forming grooves 22a and 24a (non-contact portions) are hydrophilized.

As a result, the non-contact portions are coated with a hydrophilic resin, so that the fuel cell provided with the separator efficiently discharges water droplets stagnating in the grooves to the outside. As a result, the gas diffusion layer 11b in the fuel cell has improved gas diffusibility. The corrosion resistance of the metal substrate is improved by the non-contact portions coated with a hydrophilic resin. Furthermore, the second conductive substance 34B is present on the surface of the conductive resin main layer 32 covering the projections of the metal substrate, reducing the contact resistance between the separator and the gas diffusion layer 11b.

EXAMPLES

Example 1

Example 1 related with the first embodiment will be described.

To form a conductive resin layer, 70% by weight of methyl ethyl ketone (MEK) as a solvent and 30% by weight of solid content were mixed to prepare a mixed solution. The solid content contained 50% by weight of phenol resin (RESITOP PGA4528, available from Gun Ei Chemical Industry Co., Ltd.), and 50% by weight of titanium nitride (TiN (available from JAPAN NEW METALS CO., LTD.: weight average particle size of 1.2 to 1.8 µm) as a conductive substance.

The mixed solution was applied onto both surfaces of a flat plate metal substrate composed of SUS447J1 by spray coating to form a layer having a thickness of 4 µm.

Next, 10% by weight of exfoliated graphite (CMX-40, available from Nippon Graphite Industries, Co., Ltd.) was mixed with 90% by weight of normal hexane to prepare a mixed solution of a conductive substance without a resin. The mixed solution was applied onto the surface of the layer with a spray to form a layer having a thickness of 8 µm.

The solvent normal hexane is a dispersing solvent for dispersing exfoliated graphite. Normal hexane hardly dissolves the phenol resin compared to methyl ethyl ketone (MEK).

A layer of exfoliated graphite was formed by application. The layer was left standing for 30 minutes to evaporate normal hexane. Subsequently, before hardening of the first layer, the metal substrate was heated and pressurized at a temperature of 150° C. under a surface pressure of 2 MPa with a hot press for 3 minutes to force the resin contained in the first layer into gaps between particles of the conductive substance applied without a resin. The entire layer was then hardened to form a conductive resin layer.

Next, the surface of the separator was washed with a high pressure washer to remove exfoliated graphite not restrained by the resin. The layer of exfoliated graphite was 7 µm in thickness and the total thickness of the conductive resin layer was 11 µm.

Example 2

Example 2 related with the third embodiment will be described.

To form a conductive resin sublayer, 70% by weight of methyl ethyl ketone (MEK) as a solvent and 30% by weight of solid content were mixed to prepare a mixed solution. The solid content contained 90% by weight of phenol resin (RESITOP PGA4528, available from Gun Ei Chemical Industry Co., Ltd.) and 10% by weight of titanium nitride (TiN (available from JAPAN NEW METALS CO., LTD.: weight average particle size of 1.2 to 1.8 µm) as a conductive substance.

The mixed solution corresponds to a first mixed solution, the phenol resin corresponds to a sublayer resin, and the conductive substance corresponds to a sublayer conductive substance.

The mixed solution was applied onto both surfaces of a flat plate metal substrate composed of SUS447J1 with a spray to form a conductive resin sublayer having a thickness of 3 µm.

Next, the substrate was baked at a temperature of 150° C. for 10 minutes to harden the conductive resin sublayer.

To form a conductive resin main layer, 70% by weight of methyl ethyl ketone (MEK) as a solvent and 30% by weight of solid content were mixed to prepare a mixed solution. The solid content contained 50% by weight of phenol resin (RESITOP PGA4528, available from Gun Ei Chemical Industry Co., Ltd.) and 50% by weight of titanium nitride (TiN (available from JAPAN NEW METALS CO., LTD.: weight average particle size of 1.2 to 1.8 µm)) as a conductive substance. The mixed solution corresponds to a second mixed solution, the phenol resin corresponds to a main-layer resin, and the conductive substance corresponds to a first conductive substance.

The mixed solution was applied onto the surface of the conductive resin sublayer with a spray to form a layer containing the resin and the conductive substance and having a thickness of 2 µm.

Next, 10% by weight of exfoliated graphite (CMX-40, available from Nippon Graphite Industries, Co., Ltd.) was mixed with 90% by weight of normal hexane to prepare a mixed solution of a conductive substance without a resin. The mixed solution was applied onto the surface of the conductive resin layer with a spray to form a layer of exfoliated graphite having a thickness of 10 µm.

The solvent normal hexane is a dispersing solvent for dispersing exfoliated graphite as a second conductive substance. Normal hexane hardly dissolves the phenol resin as a main-layer resin compared to the solvent of the second mixed solution (methyl ethyl ketone (MEK).

A layer of exfoliated graphite was formed by application. The layer was then left standing for 30 minutes to evaporate normal hexane. Subsequently, before hardening of the layer containing the resin and the conductive substance, the metal substrate was heated and pressurized at a temperature of 150° C. under a surface pressure of 2 MPa with a hot press for 3 minutes to force the resin contained in the layer containing the resin and the conductive substance into gaps between particles of the conductive substance applied without a resin. The entire layer was then hardened to form a conductive resin layer.

Next, the surface of the separator was washed with a high pressure washer to remove exfoliated graphite not restrained by the resin. The layer of exfoliated graphite was 6 µm in thickness and the total thickness of the conductive resin layer was 11 µm.

Comparative Example 1

Figure 16A:
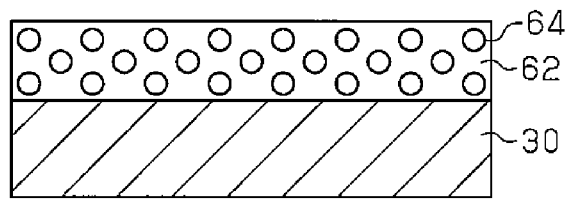
FIG. 16A is a cross-sectional view schematically showing a separator in Comparative Example 1.

To form a conductive resin layer, 40% by weight of methyl ethyl ketone (MEK) as a solvent was mixed with 60% by weight of commercially available carbon coating material (Everyohm 101P, available from Nippon Graphite Industries, Co., Ltd.) to prepare a mixed solution. The commercially available carbon coating material (Everyohm 101P, available from Nippon Graphite Industries, Co., Ltd.) was a coating material composed of graphite and a phenol resin. The mixed solution was applied onto one surface of a flat plate metal substrate 30 composed of SUS447J1 as shown in FIG. 16A with a spray to form a coating. Then, the solvent was evaporated by drying. The substrate was baked at a temperature of 150° C. for 30 minutes to form a conductive layer 62 having a thickness of 5 µm. In FIG. 16A, a conductive substance 64 composed of carbon is dispersed and arranged in the conductive layer 62.

Comparative Example 2

As conductive resin substances, 90% by weight of commercially available carbon coating material (Everyohm 101P, available from Nippon Graphite Industries, Co., Ltd.) and 10% by weight of titanium nitride (TiN (available from JAPAN NEW METALS CO., LTD.: weight average particle size of 1.2 to 1.8 μm)) were mixed. The mixture (60% by weight) was mixed with 40% by weight of methyl ethyl ketone (MEK) as a solvent to prepare a mixed solution of coating materials.

Figure 16B:
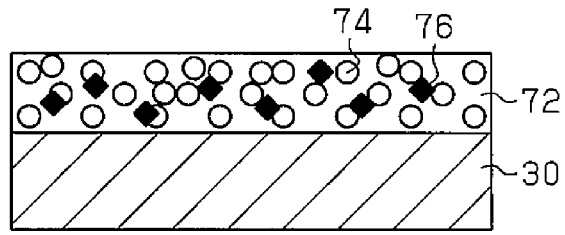
FIG. 16B is a cross-sectional view schematically showing a separator in Comparative Example 2.

The mixed solution was applied onto one surface of a flat plate metal substrate 30 composed of SUS447J1 with a spray as shown in FIG. 16B to form a coating. Then, the solvent was evaporated by drying. The substrate was baked at a temperature of 150° C. for 30 minutes to form a conductive resin layer 72 having a thickness of 5 μm. In FIG. 16B, a conductive substance 74 composed of carbon and a conductive substance 76 composed of TiN are dispersed and arranged in the conductive resin layer 72.

Comparative Example 3

To form a conductive resin layer, 90% by weight of commercially available carbon coating material (Everyohm 101P, available from Nippon Graphite Industries, Co., Ltd.) was mixed with 10% by weight of titanium nitride (TiN (available from JAPAN NEW METALS CO., LTD.: weight average particle size of 1.2 to 1.8 μm)). The mixture (60% by weight) was mixed with 40% by weight of methyl ethyl ketone (MEK) as a solvent to prepare a mixed solution.

The mixed solution was applied onto both surfaces of a flat plate metal substrate composed of SUS447J1 by spray coating to form a layer having a thickness of 5 μm.

Next, 10% by weight of exfoliated graphite (CMX-40, available from Nippon Graphite Industries, Co., Ltd.) was mixed with 90% by weight of methyl ethyl ketone (MEK) to prepare a mixed solution of conductive substance without a resin. The mixed solution was applied onto the surface of the layer with a spray to form a layer having a thickness of 3 μm.

The solvent methyl ethyl ketone (MEK) is a dispersing solvent for dispersing exfoliated graphite, and readily dissolves the phenol resin contained in the commercially available carbon coating material.

A layer of exfoliated graphite was formed by application. The layer was left standing for 30 minutes to evaporate methyl ethyl ketone (MEK). Subsequently, before hardening of the first layer, the metal substrate was heated and pressurized at a temperature of 150° C. under a surface pressure of 2 MPa with a hot press for 3 minutes to force the phenol resin into the layer applied without a resin. The entire layer was then hardened to form a conductive resin layer 82 having a thickness of 7 μm. At this time, the phenol resin bled out over the surface of exfoliated graphite.

Figure 16C:
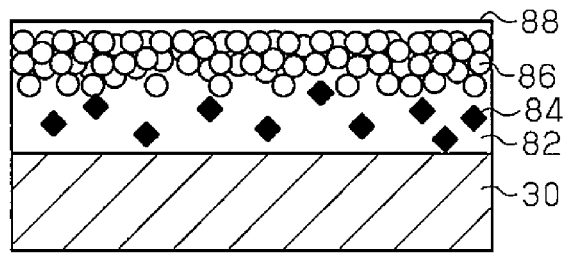
FIG. 16C is a cross-sectional view schematically showing a separator in Comparative Example 3.

FIG. 16C shows the state in Comparative Example 3 where a conductive substance 84 composed of carbon and a conductive substance 86 composed of TiN are dispersed and arranged in the conductive resin layer 82. FIG. 16C shows that a phenol resin layer 88 is laminated on the surface of the conductive resin layer 82 where the conductive substance 86 was layered.

Test on Contact Resistance

The separators in Examples 1 and 2 and Comparative Examples 1 to 3 were measured by the following method.

Figure 20:
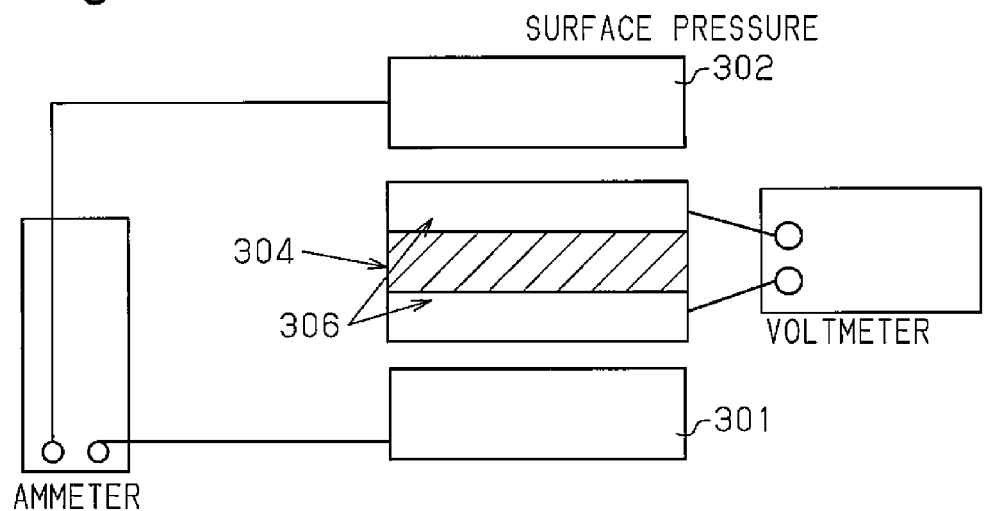
FIG. 20 is an explanatory view showing a method for measuring a contact resistance.
Figure 21A:
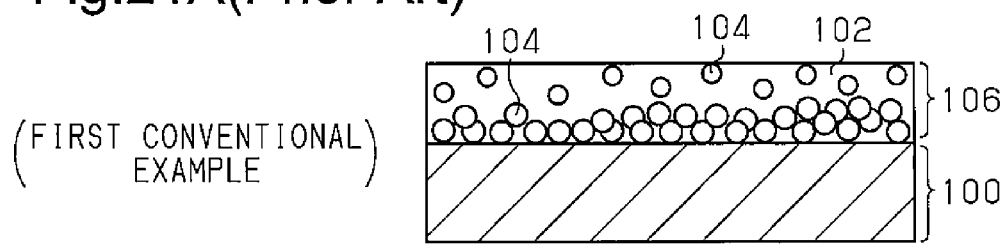
FIGS. 21A and 21B are cross-sectional views showing metallic separators in conventional examples.
Figure 21B:
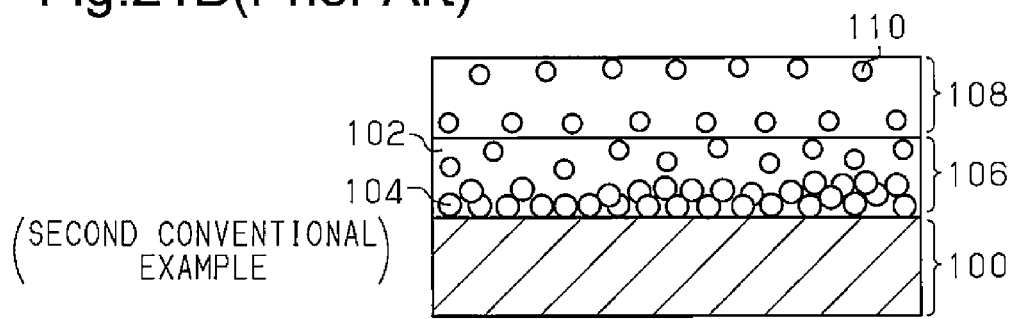
Figure 22:
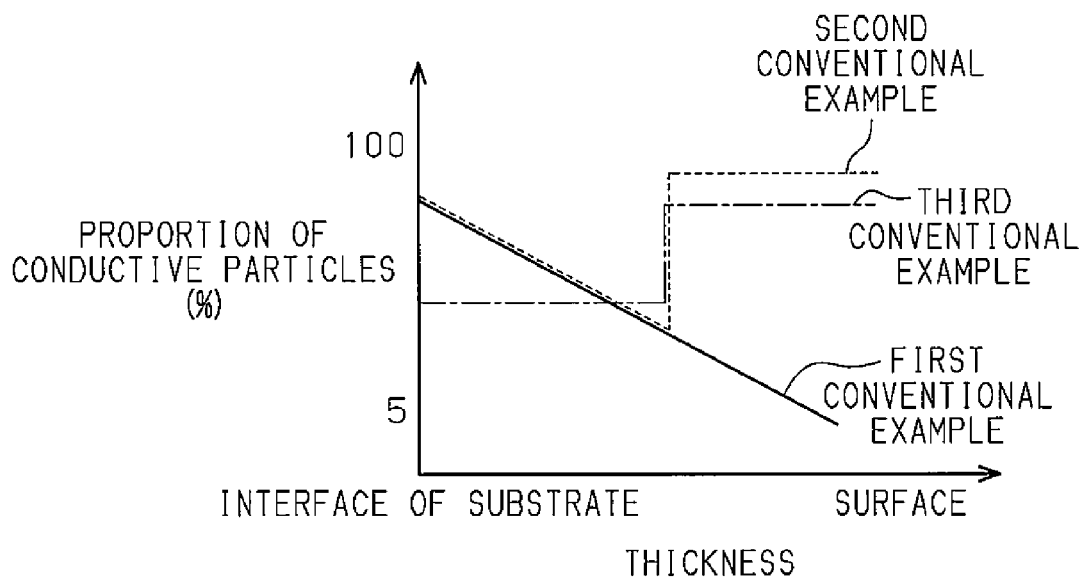
FIG. 22 is an explanatory view showing the proportion of a conductive filler in a conventional conductive layer or resin layer.
Figure 23:
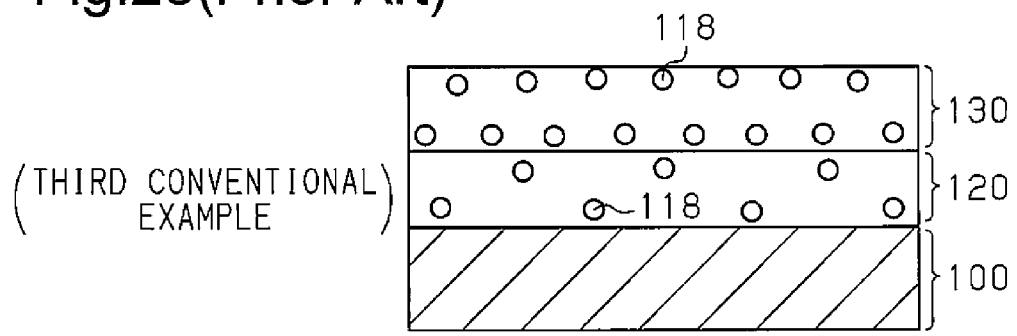
FIG. 23 is a cross-sectional view showing a metallic separator in a conventional example.

As shown in FIG. 20, both surfaces of a test sample 304 (separator) were covered with a carbon cloth 306. While a predetermined load (1 MPa) was being applied to the test sample with jigs 301 and 302 for measuring contact resistance, a predetermined current (1 A) was applied. At this time, the voltage was measured by a 4-terminal method to determine the contact resistance. In the contact resistance test, the test sample 304 for evaluation had an area of 10 cm$^2$. The carbon cloth 306 was composed of the same material as that of the gas diffusion layer 11b provided in the anode 16A and the cathode 16B illustrated in FIGS. 3 and 4.

The value obtained from the measurement of the contact resistance between the separator and the gas diffusion layer 11b described below was determined by the contact resistance test performed on one test sample 304 held between a pair of carbon cloths 306 as shown in FIG. 20.

The value obtained from the measurement of the contact resistance between the separator and another separator was determined as follows: a pair of test samples 304 prepared by the same method were laminated, and the laminated test samples 304 were held between a pair of carbon cloths 306. In this state, the contact resistance was measured.

Figure 17:
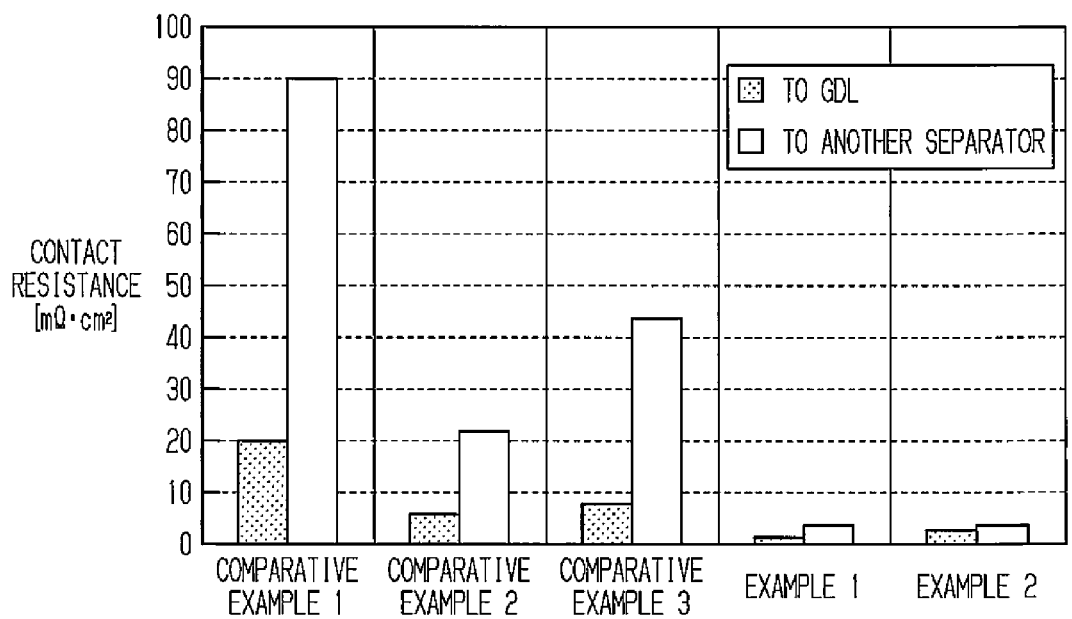
FIG. 17 is a graph showing the results of measurement of the contact resistances of the separators in Comparative Examples 1 to 3 and Examples 1 and 2.

The results of the measurement at this time are shown in FIG. 17.

The contact resistance between the separator and a GDL was 20 mΩ·cm$^2$ in Comparative Example 1, 5.5 mΩ·cm$^2$ in Comparative Example 2, and 7.8 mΩ·cm$^2$ in Comparative Example 3. In contrast, the contact resistance between the separator and a GDL in Example 1 was 1.4 mΩ·cm$^2$, and the contact resistance between the separator and a GDL in Example 2 was 3.0 mΩ·cm$^2$.

The contact resistance between the separator and another separator was 90 mΩ·cm$^2$ in Comparative Example 1, 21.4 mΩ·cm$^2$ in Comparative Example 2, and 44 mΩ·cm$^2$ in Comparative Example 3. In contrast, the contact resistance between the separator and another separator in Example 1 was 3.6 mΩ·cm$^2$, and the contact resistance between the separator and another separator in Example 2 was 4.0 mΩ·cm$^2$.

The results of the measurement are shown in FIG. 17.

Figure 18:
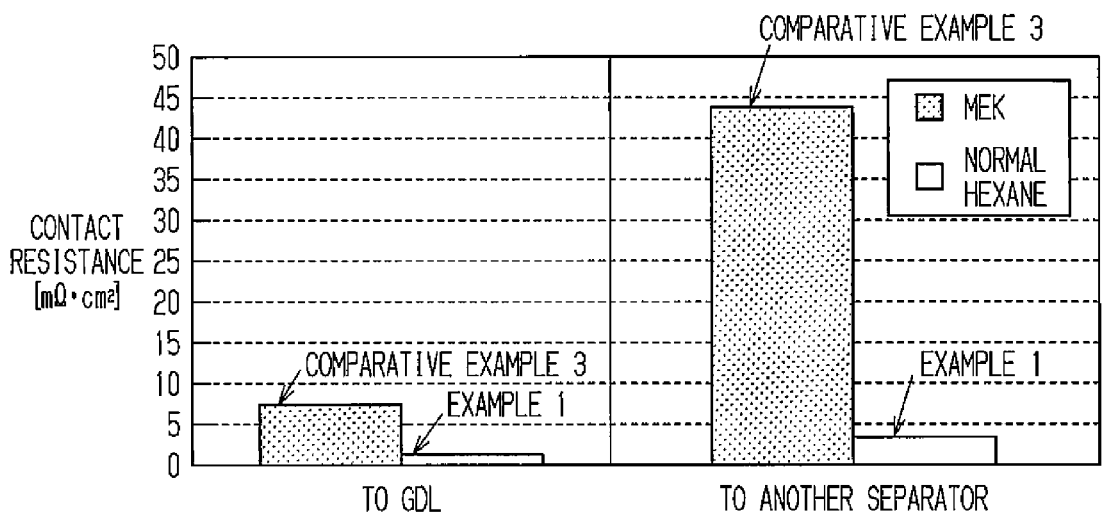
FIG. 18 is a graph showing the results of measurement of the contact resistances between the separators in Comparative Example 3 and Example 1 and GDLs and the contact resistances between the separators in Comparative Example 3 and Example 1 and other separators.

FIG. 18 is a graph showing the result of measurement on the contact resistance between the separator and a GDL and the contact resistance between the separator and another separator in Example 1 and Comparative Example 3 using normal hexane and methyl ethyl ketone (MEK), respectively, as a dispersing solvent for exfoliated graphite.

As above, the separators in Examples 1 and 2 had lower resistance values than those of the separators in Comparative Examples 1 to 3 in both of the contact resistance between the separator and a gas diffusion layer (GDL) and the contact resistance between the separator and another separator.

In the measurement of the contact resistance between the separator and a GDL using the test samples prepared in Comparative Example 3 and Example 1, the contact resistance was measured while the load (surface pressure) was changed by 0.1 MPa from 0.1 to 1.0 MPa with the jigs 301 and 302 for measuring a contact resistance. The results of measurement are shown in FIG. 14.

Using the test samples prepared in Comparative Example 3 and Example 1, the contact resistance between the separator and another separator was measured while the load was changed by 0.1 MPa between 0.2 and 1.0 MPa with the jigs 301 and 302 for measuring a contact resistance. Here, the measurement of the contact resistance between the separator and another separator corresponds to the measurement of the contact resistance between the coatings (conductive resin layers) formed on the separators. The results of measurement are shown in FIG. 15.

Figure 14:
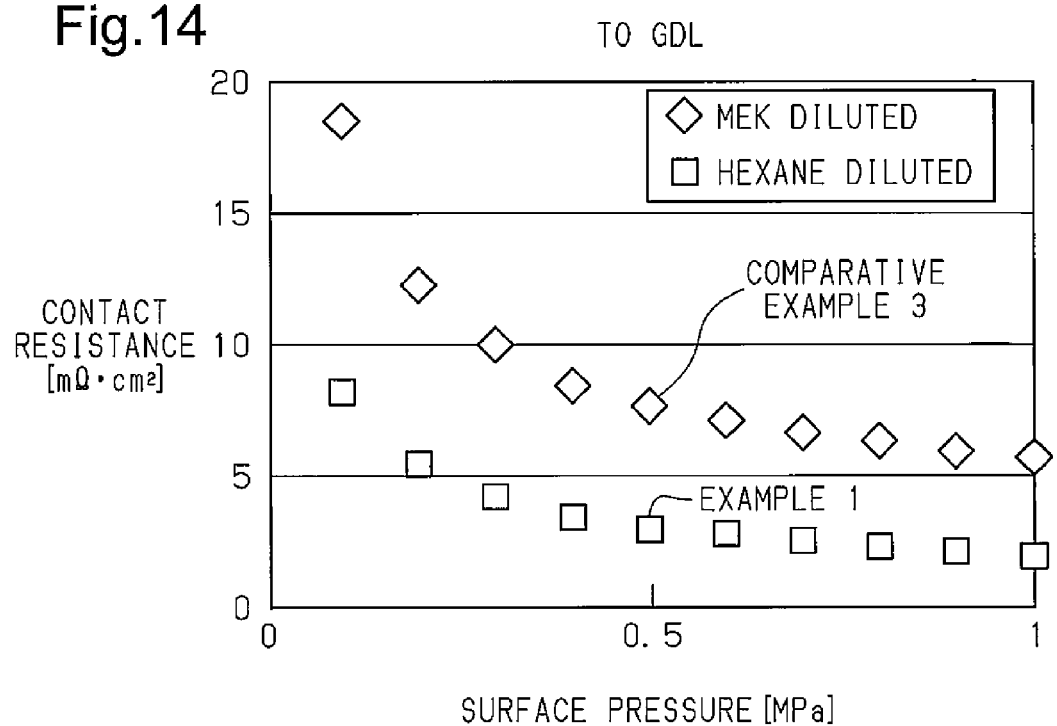
FIG. 14 is a characteristic view showing the contact resistance between a GDL and the separator in Example 1 and the contact resistance between a GDL and the separator in Comparative Example 3.
Figure 15:
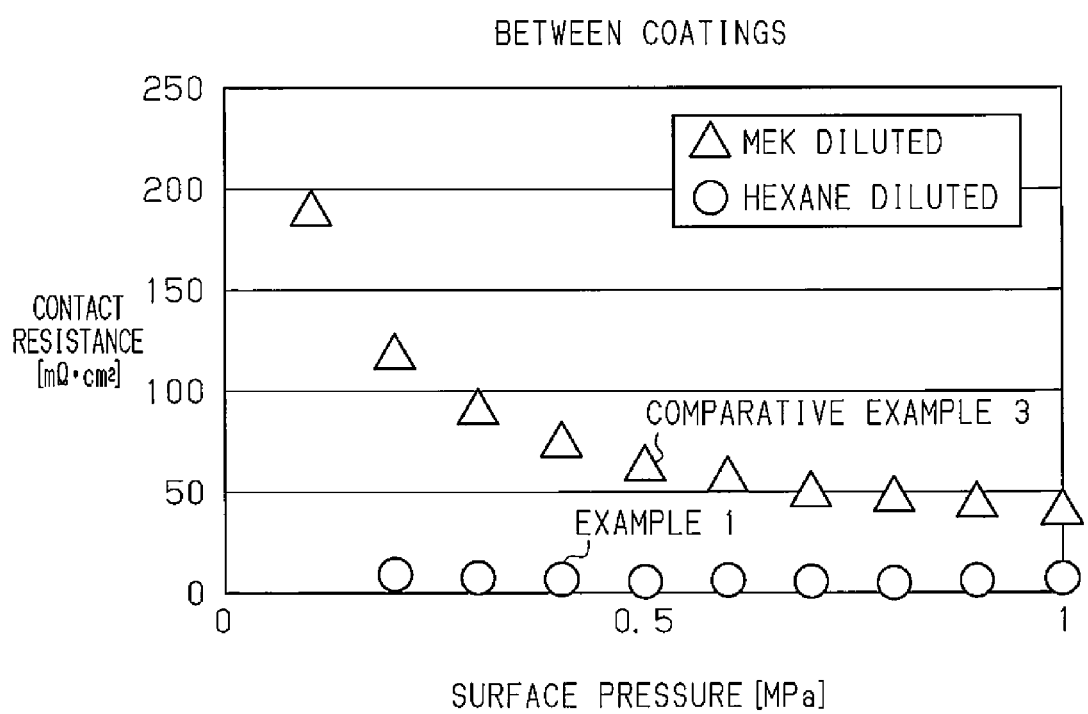
FIG. 15 is a characteristic view showing the contact resistance between the separators in Example 1 and the contact resistance between the separators in Comparative Example 3.

As shown in FIGS. 14 and 15, it turned out that the contact resistance between the separator and a GDL and the contact resistance between the separator and another separator in Example 1 were lower under each surface pressure than those in Comparative Example 3.

Constant Potential Corrosion Test

The separators in Examples 1 and 2 were subjected to a constant potential corrosion test in accordance with an electrochemical high temperature corrosion test method for metal materials (JIS Z2294) specified in Japanese Industrial Standards.

Figure 19:
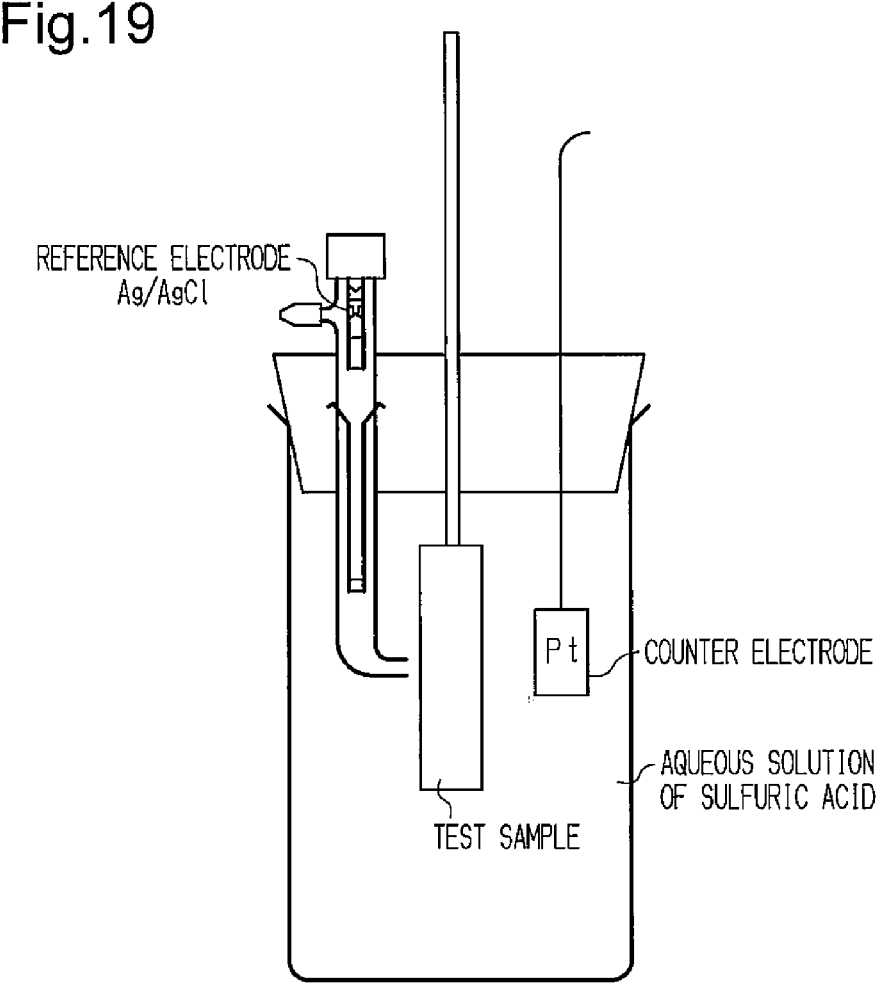
FIG. 19 is an explanatory view showing a constant potential corrosion test.

As shown in FIG. 19, test samples in Examples 1 and 2 were immersed in an aqueous solution of sulfuric acid (300 ml, pH: 3) prepared at 80° C., and the potential was kept at 0.9 VvsSHE in this state. The time for the test was 100 hours.

Eluted Metal Ion Check Test

The amount of metal ions in the aqueous solution of sulfuric acid was measured with a digital pack test multi apparatus available from KYORITSU CHEMICAL-CHECK Lab., Corp. (method for measurement: absorption spectrophotometry (LED: 470 nm, 525 nm, 615 nm)).

As a result, the amount of Fe eluted was 1.5 mg/l in the test sample of Example 1 and was below the detection limit (0.05 mg/l) in the test sample of Example 2.

The amount of Cr eluted was below the detection limit (0.05 mg/l) in the test samples of Example 1 and Example 2.

It was found that metal ions hardly eluted from the test samples in Examples 1 and 2.

The invention claimed is:

1. A method for manufacturing a fuel cell separator, comprising:
    a first step for applying a mixture of a resin and a first conductive substance onto a surface of a metal substrate to form an unhardened conductive resin layer;
    a second step for applying a second conductive substance onto a surface of the unhardened conductive resin layer; and
    a third step for hardening the unhardened conductive resin layer, wherein during the hardening, the metal substrate whose surface is covered is pressurized to force the resin into gaps between particles of the second conductive substance to cure the resin.

2. The method for manufacturing a fuel cell separator according to claim 1, wherein the second step comprises a step for mixing the second conductive substance with a solvent, and applying the mixture onto the unhardened conductive resin layer formed in the first step, wherein the resin is hardly-soluble in the solvent.

3. A method for manufacturing a fuel cell separator, comprising:
    a first step for applying a mixture of a sublayer resin and a sublayer conductive substance onto a surface of a metal substrate to form an unhardened conductive resin sublayer;
    a step for hardening the unhardened conductive resin sublayer;
    a second step for applying a mixture of a main-layer resin and a first conductive substance onto a surface of the conductive resin sublayer to form an unhardened conductive resin main layer;
    a third step for applying a second conductive substance onto a surface of the unhardened conductive resin main layer; and
    a fourth step for hardening the unhardened conductive resin main layer, wherein the metal substrate whose surface is covered is pressurized to force the main-layer resin into gaps between particles of the second conductive substance, and the main-layer resin is cured.

4. The method for manufacturing a fuel cell separator according to claim 3, wherein the third step comprises a step for mixing the second conductive substance with a solvent, and applying the mixture onto the unhardened conductive resin sublayer formed in the first step, wherein the main-layer resin is hardly-soluble in the solvent.

5. A method for manufacturing a fuel cell separator, comprising:
    a first step for applying a mixture of a sublayer resin and a sublayer conductive substance onto a surface of a metal substrate to form an unhardened conductive resin sublayer;
    a step for hardening the unhardened conductive resin sublayer;
    a second step for applying a main-layer resin onto a surface of the conductive resin sublayer to form an unhardened resin layer;
    a third step for applying a conductive substance onto a surface of the unhardened resin layer; and
    a fourth step for pressurizing the metal substrate, whose surface is covered, to force the main-layer resin contained in the unhardened resin layer into gaps between particles of the conductive substance to cure the resin, thereby forming a conductive resin main layer.

6. The method for manufacturing a fuel cell separator according to claim 5, wherein the third step comprises a step for mixing the conductive substance with a solvent, and applying the mixture onto the unhardened conductive resin sublayer formed in the first step, wherein the main-layer resin is hardly-soluble in the solvent.

7. The method for manufacturing a fuel cell separator according to claim 3, wherein
    the metal substrate has a surface including a contact portion that contacts a gas diffusion layer or another separator in a fuel cell and a non-contact portion that cannot contact the gas diffusion layer or another separator and defines a water path,
    in the first step, the sublayer resin and the sublayer conductive substance are applied to the contact portion and the non-contact portion of the metal substrate,
    in the step for hardening the unhardened conductive resin sublayer, the unhardened conductive resin sublayer formed in the contact portion and the non-contact portion in the first step is hardened,
    in the second step, a mixture of a main-layer resin and a first conductive substance is applied onto the surface of the conductive resin sublayer in the contact portion and the non-contact portion to form an unhardened conductive resin main layer,
    in the third step, a second conductive substance is applied onto a portion of the unhardened conductive resin main layer formed in the second step, which portion covers the contact portion,
    in the fourth step, the metal substrate whose surface is covered is pressurized to force the main-layer resin in the portion covering the contact portion into gaps between particles of the second conductive substance, and then the main-layer resin is cured, and
    after the fourth step, the method further comprises a fifth step for hydrophilizing a portion of the conductive resin main layer that covers the non-contact portion.

* * * * *